(12) United States Patent
Kien et al.

(10) Patent No.: US 11,207,874 B2
(45) Date of Patent: Dec. 28, 2021

(54) METHODS OF MAKING FIBROUS STRUCTURES WITH SHAPED POLYMER PARTICLES

(71) Applicant: The Procter & Gamble Company, Cincinnati, OH (US)

(72) Inventors: Kathryn Christian Kien, Cincinnati, OH (US); Michael Leslie Groombridge, Newcastle Upon Tyne (GB); Denis Alfred Gonzales, Brussels (BE); Michael McDonnell, Blyth (GB)

(73) Assignee: The Procter & Gamble Company, Cincinnati, OH (US)

( * ) Notice: Subject to any disclaimer, the term of this patent is extended or adjusted under 35 U.S.C. 154(b) by 227 days.

(21) Appl. No.: 16/200,736

(22) Filed: Nov. 27, 2018

(65) Prior Publication Data
US 2019/0193383 A1    Jun. 27, 2019

Related U.S. Application Data

(60) Provisional application No. 62/610,316, filed on Dec. 26, 2017.

(51) Int. Cl.
*B32B 37/12* (2006.01)
*B32B 37/00* (2006.01)
(Continued)

(52) U.S. Cl.
CPC ............ *B32B 37/1292* (2013.01); *B05C 3/18* (2013.01); *B05C 3/20* (2013.01); *B31F 1/07* (2013.01);
(Continued)

(58) Field of Classification Search
None
See application file for complete search history.

(56) References Cited

U.S. PATENT DOCUMENTS 3,414,459 A    12/1968   Ronald
3,547,723 A    12/1970   Gresham
(Continued)

OTHER PUBLICATIONS

All Office Actions U.S. Appl. No. 16/200,722 (P&G case 15059).
U.S. Appl. No. 16/200,722, filed Nov. 27, 2018, Kathryn Christian Kien, et al.

*Primary Examiner* — Christopher T Schatz
(74) *Attorney, Agent, or Firm* — Richard L. Alexander; Andrew J. Mueller

(57) ABSTRACT

A method of forming a fibrous structure including: providing a first textured substrate that has a first side with first discrete regions and a first continuous region extending between the first discrete regions, and a second side comprising a plurality of first discrete portions corresponding to the first discrete regions and a first continuous portion corresponding to the first continuous region; passing the first textured substrate across a nozzle of a slot coat header, wherein a heated polymer is dispensed from the nozzle; depositing the heated polymer onto one of the first or the second side of the first textured substrate to form a plurality of first polymer particles, wherein the heated polymer is substantially deposited on an area of the first textured substrate that contacts the nozzle such that at least a section of each of the first polymer particles defines a raised edge; and joining the first textured substrate to a second substrate to form the fibrous structure.

20 Claims, 14 Drawing Sheets

(51) Int. Cl.
  *B32B 5/26* (2006.01)
  *B32B 3/28* (2006.01)
  *B32B 7/14* (2006.01)
  *D04H 1/4374* (2012.01)
  *D04H 1/76* (2012.01)
  *D04H 1/732* (2012.01)
  *B31F 1/07* (2006.01)
  *B05C 3/20* (2006.01)
  *B05C 3/18* (2006.01)

(52) U.S. Cl.
  CPC .......... *B32B 3/28* (2013.01); *B32B 5/26* (2013.01); *B32B 7/14* (2013.01); *B32B 37/0084* (2013.01); *B32B 37/1207* (2013.01); *D04H 1/4374* (2013.01); *D04H 1/732* (2013.01); *D04H 1/76* (2013.01); *B32B 2250/26* (2013.01); *B32B 2255/12* (2013.01); *B32B 2255/24* (2013.01); *B32B 2555/02* (2013.01)

(56) References Cited

U.S. PATENT DOCUMENTS

| | | |
|---|---|---|
| 3,556,907 A | 1/1971 | Nystrand |
| 3,708,366 A | 1/1973 | Donnelly |
| 3,738,905 A | 6/1973 | Thomas |
| 3,867,225 A | 2/1975 | Nystrand |
| D239,137 S | 9/1976 | Donald |
| 3,994,771 A | 11/1976 | Morgan, Jr |
| 4,300,981 A | 11/1981 | Carstens |
| 4,343,259 A * | 8/1982 | McConnel ............ D06B 1/14 118/126 |
| 4,483,728 A | 11/1984 | Bauernfeind |
| 4,528,239 A | 7/1985 | Trokhan |
| 5,279,767 A | 1/1994 | Phan |
| 5,312,522 A | 5/1994 | Van Phan |
| 5,334,289 A | 8/1994 | Trokhan et al. |
| 5,628,878 A | 5/1997 | Ayers |
| 10,920,376 B2 | 2/2021 | Kien et al. |
| 2003/0148401 A1 | 8/2003 | Agrawal et al. |
| 2013/0251948 A1 | 9/2013 | Lyons et al. |
| 2014/0106127 A1 | 4/2014 | Lyons et al. |
| 2017/0258650 A1 | 9/2017 | Rosati |

\* cited by examiner

METHODS OF MAKING FIBROUS STRUCTURES WITH SHAPED POLYMER PARTICLES

FIELD

The present disclosure is directed to methods of making fibrous structures, and more particularly to methods of making fibrous structures comprising polymer particles selectively formed on one or more areas of the fibrous structure.

BACKGROUND

Products made from a fibrous web are used for a variety of purposes. For example, paper towels, facial tissues, toilet tissues, napkins, and the like are in constant use in modern industrialized societies. The large demand for such paper products has created a demand for improved versions of the products. If the paper products such as paper towels, facial tissues, napkins, toilet tissues, mop heads, and the like are to perform their intended tasks and to find wide acceptance, they must possess certain physical characteristics.

Among the more important of these characteristics are strength, softness, absorbency, and cleaning ability. Strength is the ability of a paper web to retain its physical integrity during use. Softness is the pleasing tactile sensation consumers perceive when they use the paper for its intended purposes. Absorbency is the characteristic of the paper that allows the paper to take up and retain fluids, particularly water and aqueous solutions and suspensions. The absolute quantity of fluid a given amount of paper will hold is important, but also the rate at which the paper will absorb the fluid. Cleaning ability refers to a fibrous structures' capacity to remove and/or retain soil, dirt, or body fluids from a surface, such as a kitchen counter, or body part, such as the face or hands of a user.

However, also important in today's retail environment is the appearance of a paper towel or bath tissue. That is, in addition to superior performance properties of a fibrous structure, retail consumers desire the product to be visually appealing. Thus, manufacturers of fibrous structures such as paper towels and bath tissue must produce products that both perform well, and have consumer-acceptable aesthetic qualities.

Often the two goals of superior product performance and desirable aesthetics are in contradiction to one another. For example, absorbency or strength in a paper towel may depend on processing parameters such as the structure of papermaking belts during paper making or the emboss pattern applied during converting operations. Both paper structures produced during papermaking and embossing may affect the physical properties of the finished product, but they also affect the visual, aesthetic properties. It may happen that a fibrous structure in the form of a paper towel, for example, may have superior absorbency properties in a visually un-aesthetic manner, while a paper towel with visual appeal and softness may have reduced strength and/or cleaning ability.

Accordingly, there is a need for new fibrous structures that deliver both superior performance properties, particularly cleaning of dried-on or adhered soils, and consumer-desirable aesthetic properties.

SUMMARY

In accordance with an aspect of the present disclosure, a method of forming a fibrous structure is provided. The method may comprise providing a first textured substrate comprising: a first side with first discrete regions and a first continuous region extending between the first discrete regions; and a second side comprising a plurality of first discrete portions corresponding to the first discrete regions and a first continuous portion corresponding to the first continuous region. The method may further comprise passing the first textured substrate across a nozzle of a slot coat header, wherein a heated polymer is dispensed from the nozzle; depositing the heated polymer onto one of the first or the second side of the first textured substrate to form a plurality of first polymer particles, in which the heated polymer may be substantially deposited on an area of the first textured substrate that contacts the nozzle such that at least a section of each of the first polymer particles defines a raised edge; and joining the first textured substrate to a second substrate to form the fibrous structure.

Each first discrete region may comprise an outer section and sidewall sections extending outwardly from the adjacent first continuous region to the outer section, and when the first side is facing the nozzle, the heated polymer may be substantially deposited onto the first discrete regions such that the first polymer particles do not extend to the adjacent first continuous region.

In some examples, a plurality of the first discrete regions and the corresponding first discrete portions may comprise high-density zones and the first continuous region and the corresponding first continuous portion may comprise low-density zones. In other examples, a plurality of the first discrete regions and the corresponding first discrete portions may comprise low-density zones and the first continuous region and the corresponding first continuous portion may comprise high-density zones.

In some examples, depositing the heated polymer may comprise depositing the heated polymer only onto the first discrete regions. In other examples, depositing the heated polymer may comprise depositing the heated polymer only onto the outer sections of the first discrete regions.

When the second side is facing the nozzle, the heated polymer may be deposited onto the first continuous portions such that the first polymer particles do not extend to adjacent first discrete portions.

When the first side is facing the nozzle, a plurality of the first polymer particles may have generally one of a full ring, a partial ring, or a horseshoe shape. The first polymer particles having generally the full ring shape may be formed along a perimeter of the outer section of the respective first discrete region, and the first polymer particles having generally the partial ring or the horseshoe shape may be formed along a segment of the perimeter of the outer section of the respective first discrete region.

When the first side is facing the nozzle, plurality of the first polymer particles may cover substantially an entirety of the outer section of the respective first discrete region.

When the first side is facing the nozzle, a plurality of the first polymer particles may comprise an overhang extending from the outer section of a respective first discrete region, in which the overhang is substantially parallel to a first surface plane of the first textured substrate.

At least one characteristic of the polymer particles is at least partially controlled by at least one of a rheological profile, surface energy, or solidification rate of a polymer comprising the heated polymer. The limitation "at least one of a rheological profile, surface energy, or solidification rate of a polymer comprising the heated polymer" is intended to mean "only one of a rheological profile, only one of surface energy, only one of a solidification rate of a polymer, or any combination of a rheological profile, surface energy, and solidification rate of a polymer comprising the heated polymer."

At least one characteristic of the polymer particle may be at least partially controlled by at least one of a polymer flow rate, a temperature of the heated polymer and slot coater components, a contact surface area, a feed speed of the textured substrate, or an amount of cooling applied to the textured substrate following formation of the polymer particles. The limitation "at least one of a polymer flow rate, a temperature of the heated polymer and slot coater components, a contact surface area, a feed speed of the textured substrate, or an amount of cooling applied to the textured substrate following formation of the polymer particles" is intended to mean "only a polymer flow rate, only a temperature of the heated polymer and slot coater components, only a contact surface area, only a feed speed of the textured substrate, only an amount of cooling applied to the textured substrate following formation of the polymer particles, or any combination of a polymer flow rate, a temperature of the heated polymer and slot coater components, a contact surface area, a feed speed of the textured substrate, and an amount of cooling applied to the textured substrate following formation of the polymer particles."

The method may further comprise blocking one or more sections of the nozzle of the slot coat header such that the heated polymer is deposited only on one or more sections of the first textured substrate.

The second substrate may comprise a second textured substrate comprising: a third side with second discrete regions and a second continuous region extending between the second discrete regions; and a fourth side comprising a plurality of second discrete portions corresponding to the second discrete regions and a second continuous portion corresponding to the second continuous region. The method may further comprise: passing the second textured substrate across the nozzle of the slot coat header, wherein the heated polymer is dispensed from the nozzle; and depositing the heated polymer onto one of the third or the fourth side of the second textured substrate to form a plurality of second polymer particles, in which the heated polymer may be substantially deposited on an area of the second textured substrate that contacts the nozzle, such that at least a section of each of the second polymer particles may define a raised edge.

The method may further comprise embossing at least one of the first textured substrate or the second textured substrate. The limitation "at least one of the first textured substrate or the second textured substrate" is intended to mean "only the first textured substrate, only the second textured substrate, or both the first and second textured substrates." In some examples, the at least one of the first textured substrate or the second textured substrate may be embossed prior to depositing the heated polymer. In other examples, the at least one of the first textured substrate or the second textured substrate may be embossed after depositing the heated polymer.

The method may further comprise: joining the first textured substrate to the second textured substrate such that the first discrete regions of the first textured substrate are facing the second discrete portions of the second textured substrate.

The method may further comprise: joining the first textured substrate to the second textured substrate such that the first continuous portion of the first textured substrate is facing the second continuous portion of the second substrate.

The method may further comprise: joining the first textured substrate to the second textured substrate such that the first discrete regions of the first textured substrate are facing the second discrete regions of the second textured substrate.

The method may further comprise: joining the first textured substrate to the second textured substrate such that at least one of the first polymer particles or the second polymer particles is located within the fibrous structure. The limitation "at least one of the first polymer particles or the second polymer particles" is intended to mean "only the first polymer particles, only the second polymer particles, or both the first and second polymer particles."

The method may further comprise: joining the first textured substrate to the second textured substrate such that at least one of the first polymer particles or the second polymer particles is located on an outer surface of the fibrous structure.

The method may further comprise: joining the first textured substrate to the second textured substrate such that both of the first polymer particles and the second polymer particles are located within the fibrous structure.

The method may further comprise: joining the first textured substrate to the second textured substrate such that both of the first polymer particles and the second polymer particles are located on an outer surface of the fibrous structure.

The method may further comprise: applying a cooling airflow following deposition of one or both of the first or the second polymer particles.

DETAILED DESCRIPTION

Figure 1:
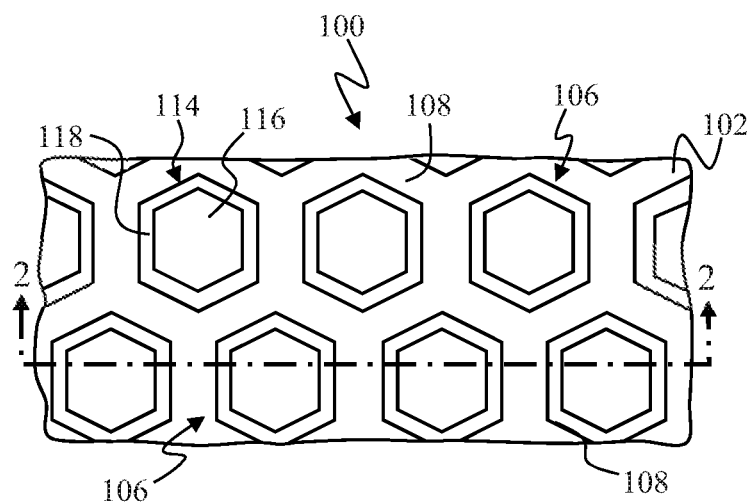
FIG. 1 is a plan view of a portion of an example textured substrate in accordance with the present disclosure.

Various non-limiting embodiments of the present disclosure will now be described to provide an overall understanding of the principles of the structure, function, manufacture, and use of the fibrous structures disclosed herein. One or more examples of these non-limiting embodiments are illustrated in the accompanying drawings. Those of ordinary skill in the art will understand that the fibrous structures described herein and illustrated in the accompanying drawings are non-limiting example embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

"Fibrous structure" as used herein means a structure that comprises one or more plies, each comprising one or more fibers, such as paper. Non-limiting examples of processes for making fibrous structures include known wet-laid papermaking processes and air-laid papermaking processes, and embossing and printing processes. Such processes typically comprise the steps of preparing a fiber composition in the form of a suspension in a medium, either wet, more specifically aqueous medium, or dry, more specifically gaseous (i.e., with air as medium). The aqueous medium used for wet-laid processes is oftentimes referred to as a fiber slurry. The fibrous suspension is then used to deposit a plurality of fibers onto a forming wire or papermaking belt such that an embryonic fibrous structure may be formed, after which drying and/or bonding the fibers together results in a fibrous structure. During the manufacturing process, visually distinct features may be produced in the finished fibrous structure, as described herein. Any of the various forming wires and papermaking belts utilized may be designed to leave a physical, three-dimensional impression in the finished paper. Such three-dimensional impressions are well known in the art, particularly in the art of "through air drying" (TAD) processes. The term "textured substrate" is used herein to refer to one ply of a fibrous structure comprising these three-dimensional impressions, wherein the fibrous structure may comprise one or more textured substrates.

Further processing of the fibrous structure may be carried out such that a finished fibrous structure is formed. The fibrous structure may also undergo one or more finishing steps such as embossing, laminating, calendering, printing, winding, cutting, and/or packaging. For example, in typical papermaking processes, the finished fibrous structure is the fibrous structure that is wound on the reel at the end of papermaking and may subsequently be converted into a finished product (e.g., a sanitary tissue product). Embossing is typically performed by one of two processes: knob-to-knob embossing, in which protuberances on axially parallel rolls juxtaposed to form a nip therebetween are registered with protuberances on the opposing roll, and nested embossing, in which the protuberances of one roll mesh between the protuberances of the other roll. Examples of knob-to-knob embossing and nested embossing are illustrated in U.S. Pat. Nos. 3,414,459; 3,547,723; 3,556,907; 3,708,366; 3,738,905; 3,867,225; and 4,483,728. U.S. Pat. No. D239,137 illustrates an emboss pattern found on commercially successful paper toweling.

"Machine Direction" or "MD" as used herein means the direction on a web corresponding to the direction parallel to the flow of a fibrous web or fibrous structure through a fibrous structure making machine.

"Cross Machine Direction" or "CD" as used herein means a direction perpendicular to the Machine Direction in the plane of the web.

"Relatively low density" as used herein means a portion of a fibrous structure having a density that is lower than a relatively high-density portion of the fibrous structure. The relatively low density may be in the range of 0.02 $g/cm^3$ to 0.09 $g/cm^3$, for example, relative to a high density that may be in the range of 0.1 to 0.13 $g/cm^3$.

"Relatively high density" as used herein means a portion of a fibrous structure having a density that is higher than a relatively low-density portion of the fibrous structure. The relatively high density may be in the range of 0.1 to 0.13 $g/cm^3$, for example, relative to a low density that may be in the range of 0.02 $g/cm^3$ to 0.09 $g/cm^3$.

"Discrete region" or "discrete portion" as used herein means a discrete area, i.e., a portion of a papermaking belt or fibrous structure defined or surrounded by, or at least partially defined or surrounded by, a substantially continuous deflection conduit or substantially continuous region that has an enclosed perimeter.

"Substantially continuous" as used herein with respect to high- or low-density networks means the network fully defines or surrounds more of the discrete regions or discrete deflection elements than it partially defines or surrounds.

"Semicontinuous" as used herein with respect to high- or low-density networks means the network extends substantially throughout one direction of the network, and each region in the network is spaced apart from adjacent regions. Examples of structures for forming semicontinuous patterns are described in U.S. Pat. No. 5,628,876.

The present disclosure relates to a fibrous structure comprising a plurality of discrete regions and a plurality of continuous regions. In some aspects, the discrete regions may be relatively high density, and the continuous regions may be relatively low density. In other aspects, the discrete regions may be relative low density, and the continuous regions may be relatively high density. The fibrous structure may comprise one or more plies, each comprising a textured substrate. Polymer particles may be formed on a plurality of the discrete regions, a plurality of the continuous regions, or both.

The fibrous structures of the present disclosure may be in the form of sanitary tissue product rolls. Such sanitary tissue product rolls can comprise a plurality of connected, but perforated sheets of one or more plies, that are separably dispensable from adjacent sheets, such as is known for paper towels and bath tissue, which are both considered sanitary tissue products when in roll form. The fibrous structures of the present disclosure may comprises additives such as softening agents, temporary wet strength agents, permanent wet strength agents (such as polyamido-amino-epichlorohydrine (PAE) polymers), bulk softening agents, lotions, silicones, wetting agents, latexes, especially surface-pattern-applied latexes, dry strength agents (such as carboxymethylcellulose, starches, or polyacrylamide polymers), and other types of additives suitable for inclusion in and/or on sanitary tissue products and/or fibrous structures.

Figure 2A:
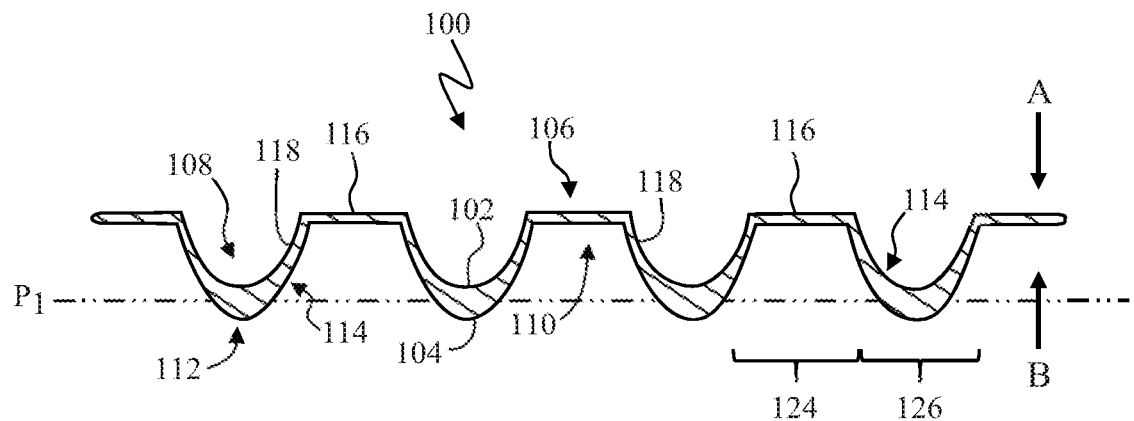
FIGS. 2A and 2B are cross-sectional views taken along line 2-2 of the textured substrate of FIG. 1.
Figure 2B:
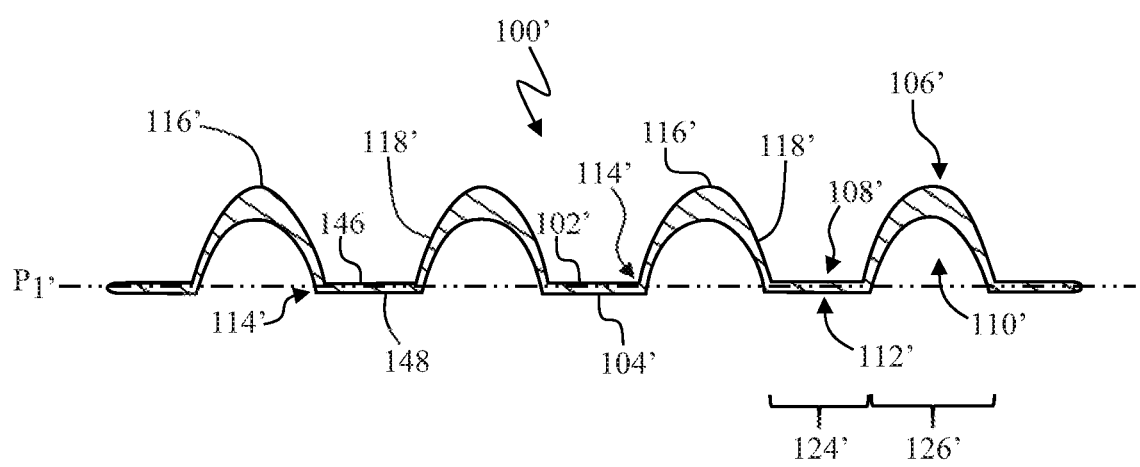

FIG. 1 is a plan view of a portion of an exemplary one-ply textured substrate 100, which could define a single-ply fibrous structure or one ply of a multi-ply fibrous structure. FIGS. 2A and 2B are cross-sectional views taken along line 2-2 of FIG. 1. With reference to FIGS. 1, 2A, and 2B, the textured substrate 100, 100' comprises a first side 102, 102' and a second side 104, 104'. The first side 102, 102' of the respective textured substrate 100, 100' comprises a plurality of discrete regions 106, 106' and a continuous region 108, 108' extending between the discrete regions 106, 106'. In the example shown in FIG. 1, the continuous region 108, 108' may comprise a substantially continuous network in which discrete regions 106, 106' are dispersed throughout the substantially continuous network. The textured substrate 100, 100' also comprises transition regions 114, 114' positioned intermediate the discrete regions 106, 106' and the continuous region 108, 108'. One of the transition regions 114, 114' at least partially encircles each of the discrete regions 106, 106'. The second side 104, 104' of each textured substrate 100, 100' comprises a plurality of discrete portions 110, 110' corresponding to the discrete regions 106, 106' on the first side 102, 102' and a continuous portion 112, 112' corresponding to the continuous region 108, 108' on the first side 102, 102'.

In some examples, as shown in FIG. 2A, the discrete regions 106 and corresponding discrete portions 110 may comprise a relatively high-density zone 124, and the continuous region 108 and corresponding continuous portion 112 may comprise a relatively low-density zone 126. In other examples, as shown in FIG. 2B, the discrete regions 106' and corresponding discrete portions 110' may comprise a relatively low-density zone 126', and the continuous region 108' and corresponding continuous portion 112' may comprise a relatively high-density zone 124'. The low-density zones 126, 126' are depicted throughout the Figures as having a greater thickness than adjacent high-density zones 124, 124'.

The exemplary textured substrates 100, 100' depicted in FIGS. 1, 2A, and 2B may comprise a wet-laid fibrous structure ply and may be formed using one or more deflection members, such as a deflection member formed from a foraminous secondary belt 121 coated with resin to provide a three-dimensional structure, for example, as described in U.S. Pat. Nos. 4,528,239; 5,334,289; and 5,628,876 (see also FIG. 17). Accordingly, the deflection member may comprise a plurality of raised portions. Each raised portion of the deflection member forms a corresponding high-density zone 124, 124' in the respective textured substrate 100, 100'. The deflection member may further include deflection conduits, i.e., areas of the foraminous secondary belt where holes are present and resin does not completely block the holes, for forming the low-density zones 126, 126'. The exemplary textured substrates 100, 100' shown in FIGS. 2A and 2B may be formed by transferring an embryonic web (see FIG. 17) onto the deflection member such that the discrete regions 106, 106' extend outwardly on one side, i.e., the first side 102, 102', from a respective surface plane $P_1$, $P_1'$ of the textured substrates 100, 100'. Hence, a deflection member would contact the second side 104 so as to form the discrete regions 106 in the textured substrate 100 of FIG. 2A and a deflection member would contact the first side 102' so as to form the continuous regions 104' in the textured substrate 100' of FIG. 2B.

In some examples, the raised portions of the deflection member may comprise discrete elements that would correspondingly form the high-density discrete regions 106 and discrete portions 110 of the textured substrate 100, as shown in FIG. 2A. A shape and/or pattern of the high-density discrete regions 106 and discrete portions 110 may be at least partially defined by a shape and/or pattern of the raised portions of the deflection member comprising discrete elements. While the discrete regions 106 in FIG. 1 are illustrated as comprising a plurality of uniformly spaced hexagons, it is to be understood that one or more other shapes or patterns may also be formed. For example, the discrete regions 106 (when viewed from the direction of arrow A in FIG. 2A) may be substantially circular, ovate (see FIGS. 11A-11C), square (see FIG. 11E), diamond-shaped (see FIG. 4), trapezoidal, or any other suitable polygonal shape (not shown unless otherwise noted). The discrete regions 106 may be uniformly spaced, modulated (i.e., non-uniform but organized), or randomly spaced.

Figure 2C:
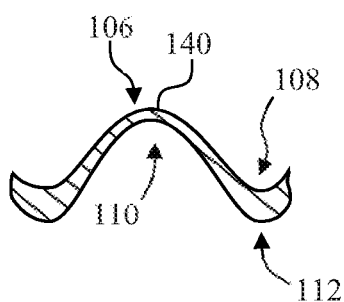
FIGS. 2C and 2D are cross-sectional views additional examples textured substrates in accordance with the present disclosure.
Figure 2D:
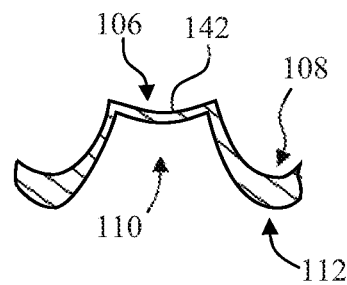
Figure 2E:
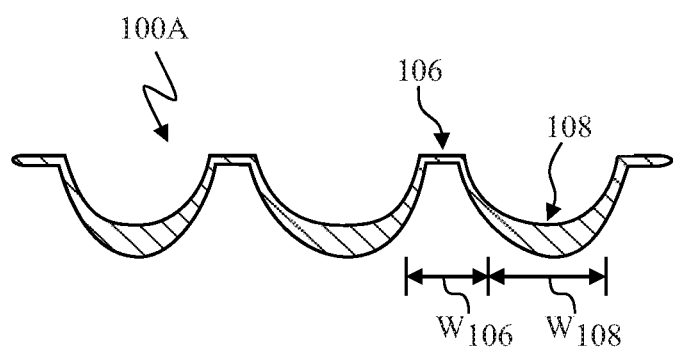
FIG. 2E is a cross-sectional view of an example textured substrate in accordance with the present disclosure.

In addition, one or more of a size of the discrete elements of the deflection member or a spacing therebetween may be adjusted to achieve a desired spacing and ratio of a surface area comprising the discrete regions 106 to a surface area comprising the continuous region 108. For example, as shown in FIG. 2E, a width $W_{106}$ of the discrete regions 106 may be decreased, such that a spacing between the discrete regions 106 is increased and the ratio of the discrete region surface area to the continuous region surface area is decreased, as compared to the examples shown in FIGS. 2A and 2B. In other examples, a width $W_{108}$ of the continuous region 108 of the textured substrate 100A may be increased. In further examples (not shown), the width $W_{106}$ of the discrete regions 106 may be increased or the width $W_{108}$ of the continuous region 108 may be decreased, such that the spacing between the discrete regions 106 is decreased and the ratio of the discrete region surface area to the continuous region surface area is increased, as compared to the examples shown in FIGS. 2A and 2B. In yet further examples, both the width $W_{106}$ of the discrete regions 106 and the width $W_{108}$ of the continuous region 108 may be altered.

In other examples, the raised portions of the deflection member may form a continuous network, which would correspondingly form the high-density continuous region 108' and continuous portion 112' of the textured substrate 100', as shown in FIG. 2B. A shape and/or pattern of the high-density continuous region 108' and the corresponding continuous portion 112' may be at least partially defined by the shape and/or pattern of the raised portions of the deflection member comprising a continuous network. As shown in FIG. 2B, the high-density continuous regions 108' may comprise a substantially planar section 146 that is substantially co-planar with the surface plane $P_1'$ of the textured substrate 100'. The high-density continuous portions 112' may comprise a substantially planar area 148 corresponding to the substantially planar section 146.

In all examples, a shape of the low-density zones 126, 126' may be at least partially defined by the shape of the continuous network of raised portions on the deflection member and/or by the deflection conduit(s), both of which may comprise any suitable shape and/or pattern. For example, with reference to FIGS. 1 and 2B, at least a portion of the low-density discrete regions 106', e.g., the transition regions 114', may comprise a substantially hexagonal shape, when viewed from the first surface 102' (i.e., from the direction of arrow A in FIG. 2A). This hexagonal shape may be at least partially defined by the pattern of raised portions on the deflection member that are used to form the high-density continuous regions 108'.

In the exemplary textured substrates 100, 100' depicted in FIGS. 1, 2A, and 2B, a plurality of the discrete regions 106, 106' may comprise an outer section 116, 116' and sidewall sections 118, 118' extending outwardly from the continuous region 108, 108' to the respective outer section 116, 116' of each discrete region 106, 106'. For example, a plurality of the discrete regions 106, 106' may comprise protrusions that extend or protrude from the respective surface plane $P_1$, $P_1'$ of the textured substrates 100, 100' toward an imaginary observer looking in the direction of arrow A of FIG. 2A (i.e., looking at the first surface 102, 102'). As shown in FIGS. 2A and 2B, the surface planes $P_1$, $P_1'$ may be at least partially defined by the continuous regions 108, 108' and continuous portions 112, 112' of the respective textured substrates 100, 100'. When viewed by an imaginary observer looking in the direction indicated by arrow B of FIG. 2A (i.e., looking at the second surface 104, 104'), the plurality of discrete portions 110, 110' may appear to be recesses, cavities, or dimples. In some particular aspects, a shape of the outer section 116 of the high-density discrete regions 106 may be at least partially defined by the shape of the raised portions of the deflection member. In some examples, as shown in FIG. 2A, the outer section 116 may be substantially planar and may be generally co-planar with the surface plane $P_1$ of the textured substrate 100. In other examples, the discrete region 106 may comprise a dome-shaped outer section 140, as shown in FIG. 2C, or a concave outer section 142, as shown in FIG. 2D.

Figure 3A:
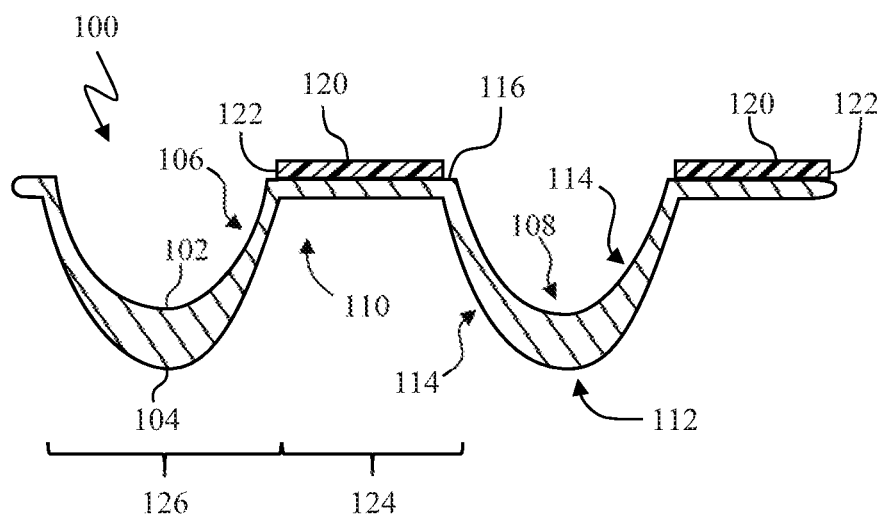
FIGS. 3A-3C are enlarged cross-sectional views of a portion of the textured substrate of FIG. 2A comprising polymer particles.
Figure 3B:
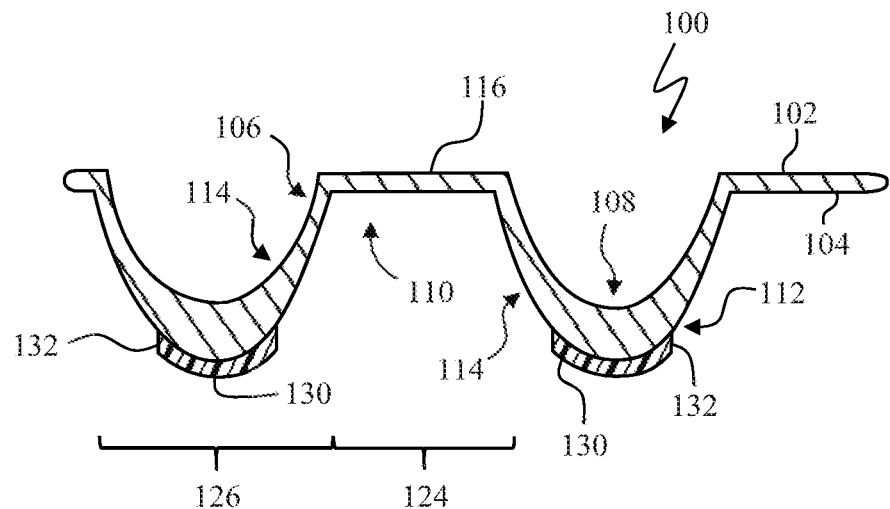
Figure 3C:
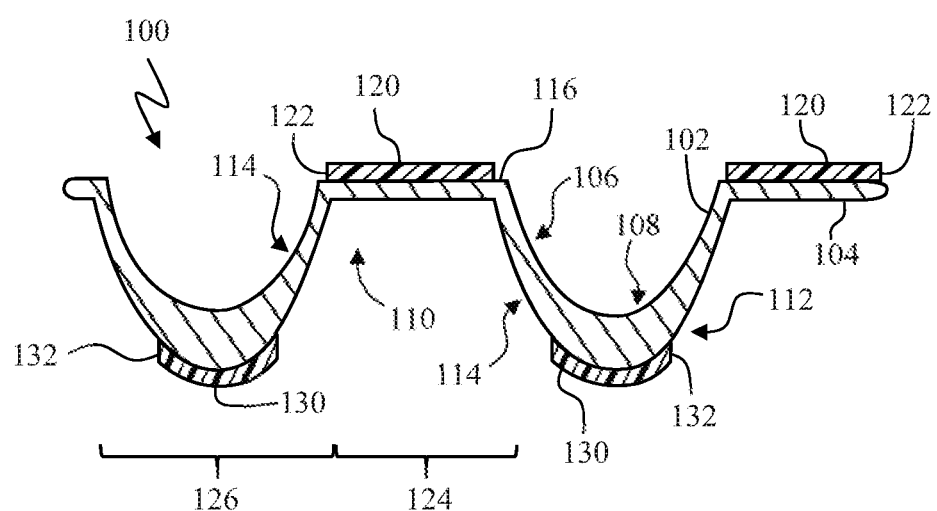

FIGS. 3A-3C are enlarged views of a portion of the textured substrate 100 of FIG. 2A comprising polymer particles 120, 130 deposited on one or both of the first side 102 or the second side 104 of the textured substrate 100, as described herein in detail. As shown in FIG. 3A, in some instances, the polymer particles 120 may be deposited only on the first side 102 of the textured substrate 100. In other instances, the polymer particles 130 may be deposited only on the second side 104 as shown in FIG. 3B. As shown in FIG. 3C, in further instances, polymer particles 120, 130 may be deposited on both the first side 102 and the second side 104 of the textured substrate 100.

Figure 3D:
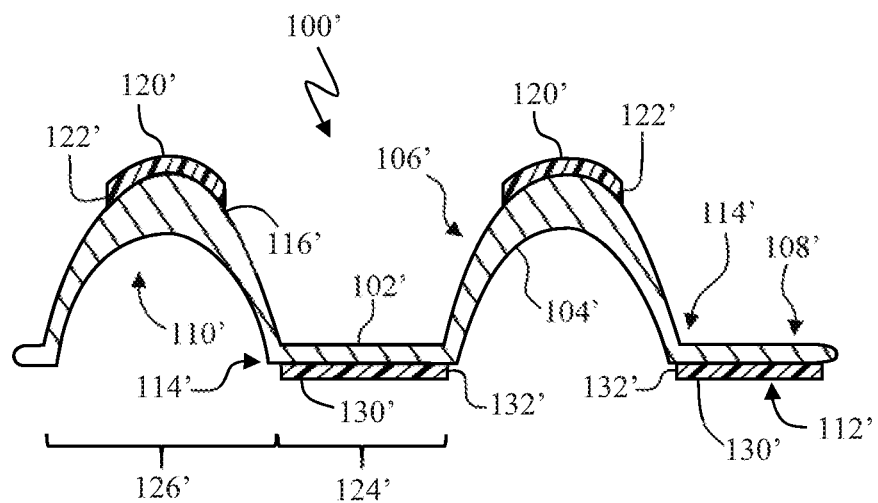
FIG. 3D is an enlarged cross-sectional view of a portion of the textured substrate of FIG. 2B comprising polymer particles.

FIG. 3D is an enlarged view of a portion of the textured substrate 100' of FIG. 2B comprising polymer particles 120', 130'. Similar to the examples shown in FIGS. 3A-3C, the polymer particles 120', 130' in the exemplary textured substrate 100' of FIG. 3D may be deposited only on the first side 102' of the textured substrate 100', only on the second side 104' of the textured substrate 100', or on both the first side 102' and the second side 104' of the textured substrate 100'.

Figure 4:
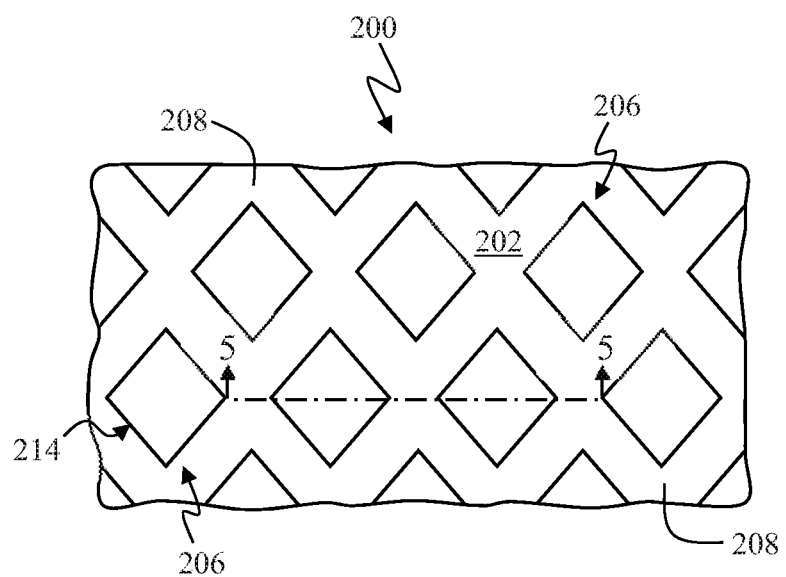
FIG. 4 is a plan view of a portion of another example textured substrate in accordance with the present disclosure.
Figure 5A:
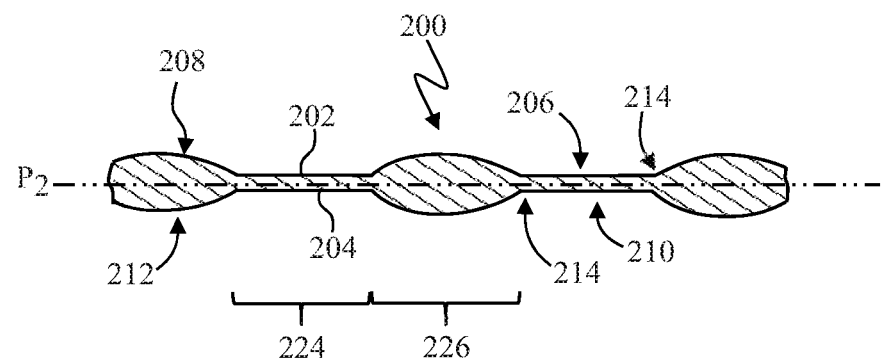
FIG. 5A is a cross-sectional view taken along line 5-5 of the textured substrate of FIG. 4.
Figure 5B:
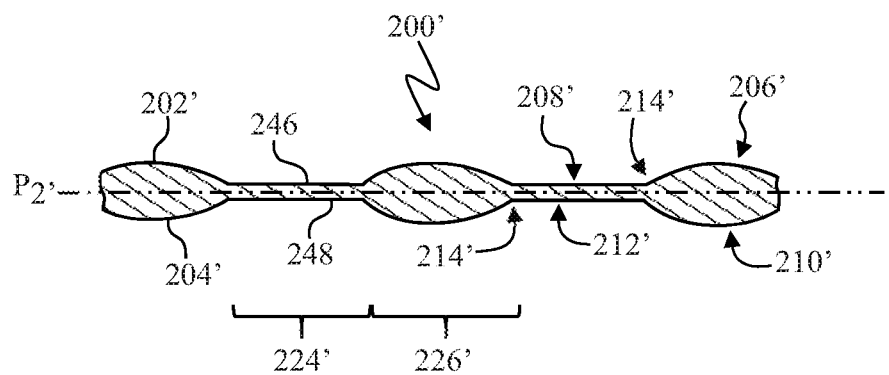
FIG. 5B is a cross-sectional view, similar to FIG. 5A, of an additional example textured substrate in accordance with the present disclosure.

FIG. 4 is a plan view of a portion of another exemplary one-ply textured substrate 200, which could define a single-ply fibrous structure or one ply of a multi-ply fibrous structure. FIG. 5A is a cross-sectional view taken along line 5-5 in FIG. 4, and FIG. 5B is a cross-sectional view, similar to FIG. 5A, of an additional exemplary textured substrate 200'. Each of the textured substrates 200, 200' in FIGS. 4, 5A, and 5B comprises a first side 202, 202' and a second side 204, 204'. The first side 202, 202' of each textured substrate 200, 200' comprises a plurality of discrete regions 206, 206' and a continuous region 208, 208' extending between the discrete regions 206, 206'. The continuous region 208, 208' may comprise a substantially continuous network in which the discrete regions 206, 206' are dispersed throughout the substantially continuous network. The textured substrates 200, 200' also comprise transition regions 214, 214' positioned intermediate the discrete regions 206, 206' and the continuous region 208, 208'. One of the transition regions 214, 214' at least partially encircles each of the discrete regions 206, 206'. The second side 204, 204' of each textured substrate 200, 200' comprises a plurality of discrete portions 210, 210' corresponding to the discrete regions 206, 206' on the first side 202, 202' and a continuous portion 212, 212' corresponding to the continuous region 208, 208' on the first side 202, 202'.

In some examples, as shown in FIG. 5A, the discrete regions 206 and corresponding discrete portions 210 of the textured substrate 200 may comprise a relatively high-density zone 224, and the continuous region 208 and corresponding continuous portion 212 may comprise a relatively low-density zone 226. In other examples, as shown in FIG. 5B, the discrete regions 206' and corresponding discrete portions 210' of the textured substrate 200' may comprise a relatively low-density zone 226', and the continuous region 208' and corresponding continuous portion 212' may comprise a relatively high-density zone 224'. The textured substrates depicted in FIGS. 4, 5A, and 5B may be formed such that the low-density zones 226, 226' extend outwardly on both sides 202, 204/202', 204' from a respective surface plane $P_2$, $P_2'$ of the textured substrates 200, 200'.

Figure 17:
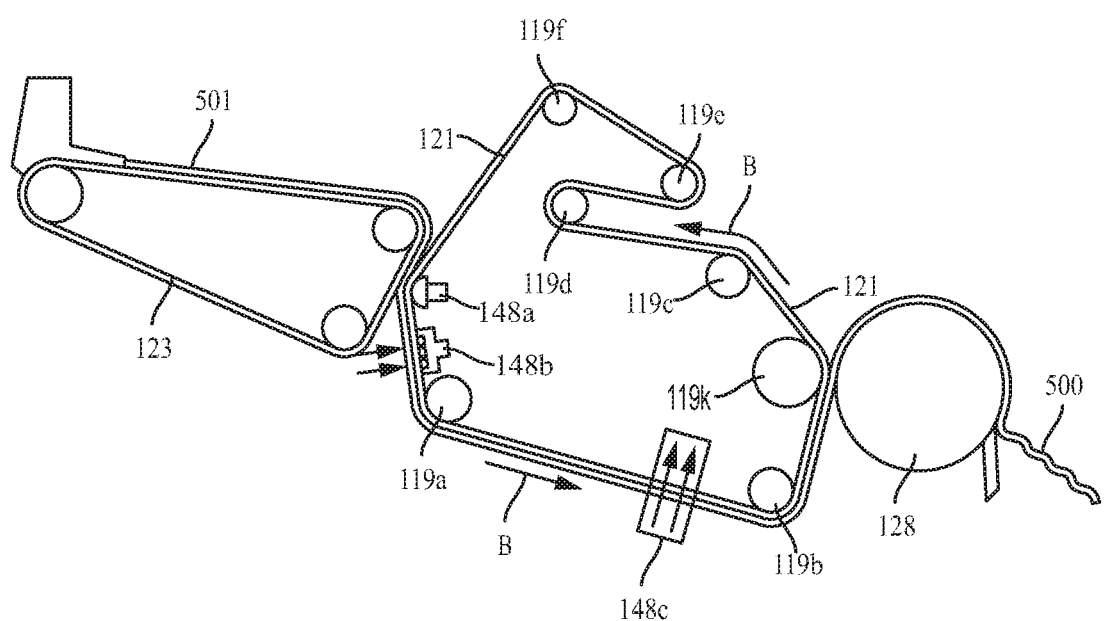
FIG. 17 is an example process for making a textured substrate according to the present disclosure.

In some examples, the exemplary textured substrates 200, 200' depicted in FIGS. 4, 5A, and 5B may comprise a wet-laid fibrous structure ply and may be formed using deflection members (see FIG. 17). For example, one deflection member may comprise a plurality of raised portions that form a corresponding one of the high-density zones 224, 224' and deflection conduits that form a corresponding one of the low-density zones 226, 226' on one side, e.g., the first side 202, 202', of the respective textured substrate 200, 200'. A second deflection member comprising corresponding raised portions and deflection conduits may be used to form the high-density zones, 224, 224' and low-density zones 226, 226' on the other side, e.g., the second side 204, 204', of the respective textured substrate 200, 200'. Hence, the high-density discrete regions 206 and discrete portions 210 of FIG. 5A may be formed by a deflection member with raised portions comprising discrete elements, and the high density continuous region 208' and continuous portion 212' of FIG. 5B may be formed by a deflection member with raised portions that form a continuous network, as described herein. In other examples, the exemplary textured substrates 200, 200' depicted in FIGS. 4, 5A, and 5B may be formed by an embossing and/or patterned calendering process, as described herein. For example, the textured substrate 200, 200' may be passed through a nip comprising one or more of a patterned steel roll, a smooth rubber covered roll, a smooth steel roll, and/or a patterned rubber covered roll, in which the patterns on the roll(s) form the corresponding high-density zones 224, 224' and low-density zones 226, 226' of the textured substrate 200, 200'. Examples these processes are illustrated in, for example, U.S. Pat. No. 3,414,459.

As previously described, a shape and/or pattern of the high-density discrete regions 206 and discrete portions 210 of the textured substrate 200 depicted in FIG. 5A may be at least partially defined by a shape and/or pattern of the raised portions of deflection members comprising discrete elements or by the patterns on the roll(s) used to form the textured substrate 200. While the discrete regions 206 in FIG. 4 are illustrated as comprising a plurality of uniformly spaced diamond shapes, it is to be understood that one or more other shapes or patterns may also be formed, as described herein. Likewise, a shape and/or pattern of the high-density continuous region 208' and the corresponding continuous portion 212' of the textured substrate 200' depicted in FIG. 5B may be at least partially defined by the shape and/or pattern of the raised portions of the deflection members or by the patterns on the roll(s) used to form the textured substrate 200'. As shown in FIG. 5B, the high-density continuous regions 208' may comprise a substantially planar section 246 that is substantially co-planar with the surface plane $P_2'$ of the textured substrate 200'. The high-density continuous portions 212' may comprise a substantially planar area 248 corresponding to the substantially planar section 246.

In all examples, a shape of the low-density zones 226, 226' may be at least partially defined by the shape of the continuous network of raised portions on the deflection member and/or by the deflection conduits or by the patterns on the roll(s) used to form the respective textured substrate 200, 200', both of which may comprise any suitable shape and/or pattern. For example, with reference to FIGS. 4 and 5B, at least a portion of the low-density discrete regions 206', e.g., the transition regions 214', may comprise a diamond shape (see FIG. 1) when viewed from the first surface 202'. This diamond shape may be at least partially defined by the pattern of raised portions on the deflection members that are used to form the high-density continuous regions 208'.

Figure 6:
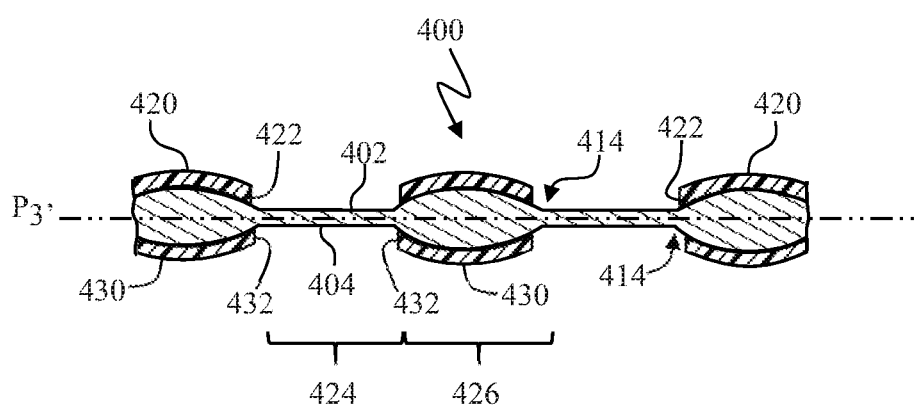
FIG. 6 is an enlarged cross-sectional view of a portion of either of the textured substrates of FIG. 5A or 5B.

FIG. 6 is an enlarged view of a portion of a textured substrate 400, which may correspond to either of the textured substrates 200, 200' depicted in FIGS. 5A and 5B. The textured substrate 400 comprises high-density zones 424 and low-density zones 426 and may comprise a surface plane $P_3$ that may be at least partially defined by the high-density zones 424. The textured substrate 400 may comprise polymer particles 420, 430 deposited on one or both of the first or second sides 402, 404. Similar to the examples shown in FIGS. 3A-3C, the polymer particles 420, 430 in the exemplary textured substrate 400 of FIG. 6 may be deposited only on the first side 402 of the textured substrate 400, only on the second side 404 of the textured substrate 400, or on both the first side 402 and the second side 404 of the textured substrate 400. In some examples, similar to the textured substrate 200 of FIG. 5A, the relatively high-density zones 424 of the textured substrate 400 may comprise the discrete regions and the corresponding discrete portions (not separately labeled in FIG. 6), and the relatively low-density zones 426 may comprise a continuous region and the corresponding continuous portion (not separately labeled in FIG. 6). In other examples, similar to the textured substrate 200' of FIG. 5B, the relatively high-density zones 424 of the textured substrate 400 may comprise a continuous region and the corresponding continuous portion (not separately labeled in FIG. 6), and the relatively low-density zones 426 may comprise the discrete regions and the corresponding discrete portions (not separately labeled in FIG. 6).

Figure 7:
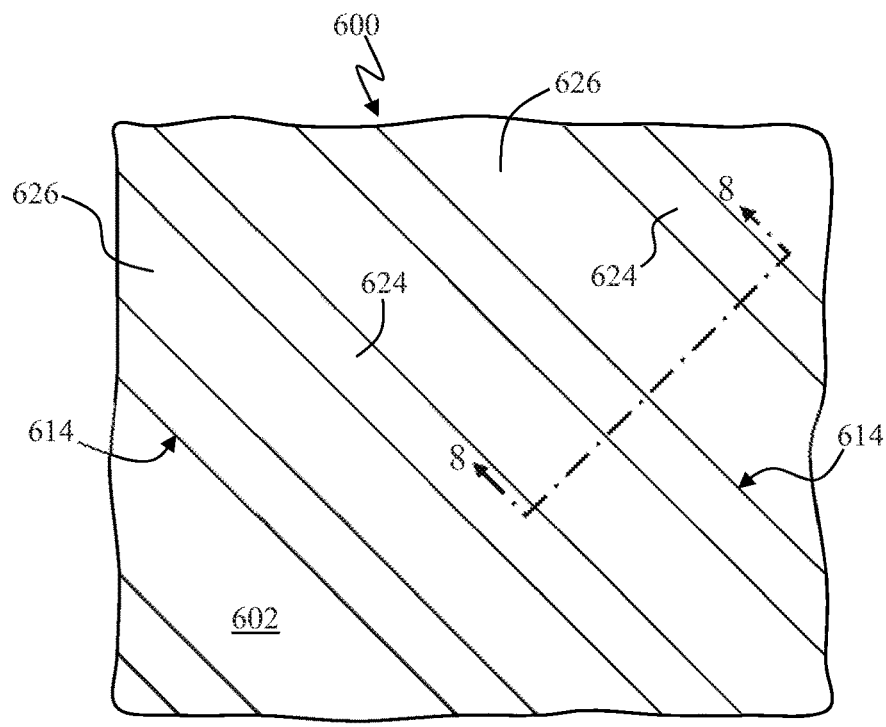
FIG. 7 is a plan view of a portion of another example textured substrate in accordance with the present disclosure.
Figure 8A:
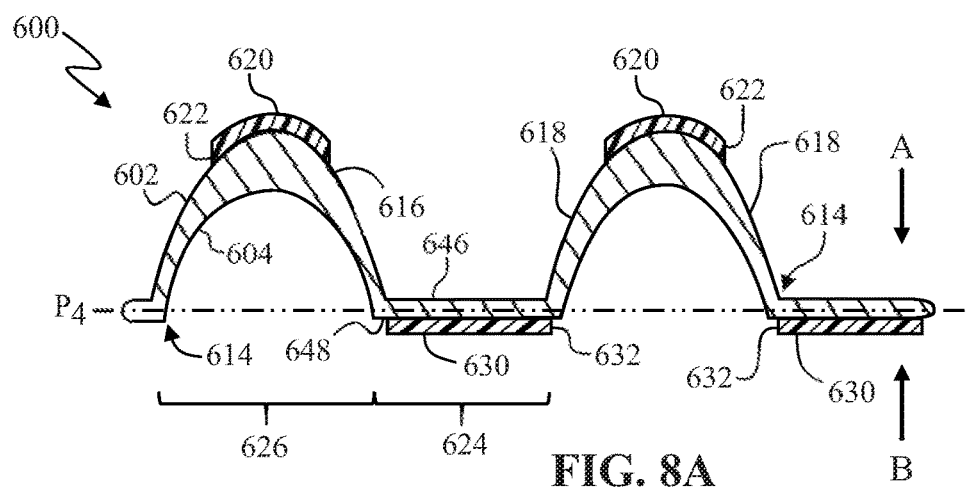
FIG. 8A is a cross-sectional view taken along line 8-8 of the textured substrate of FIG. 7.
Figure 8B:
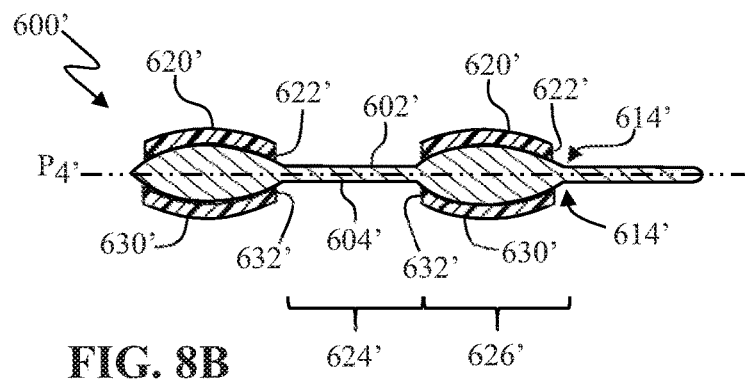
FIG. 8B is a cross-sectional view, similar to FIG. 8A, of an additional example textured substrate in accordance with the present disclosure.

FIG. 7 is a plan view of a portion of another exemplary one-ply textured substrate 600, which could define a singleply fibrous structure or one ply of a multi-ply fibrous structure. FIG. 8A is a cross-sectional view taken along line 8-8 in FIG. 7 of the textured substrate 600 of FIG. 7, and FIG. 8B is a cross-sectional view, similar to FIG. 8A, of another exemplary textured substrate 600'. With reference to FIGS. 7, 8A, and 8B, the textured substrate 600, 600' comprise a first side 602, 602' and a second side 604, 604'. The textured substrates 600, 600' each comprise a plurality of substantially continuous or semicontinuous, relatively high-density zones 624, 624' and a plurality of substantially continuous or semicontinuous, relatively low-density zones 626, 626'. Each of the textured substrates 600, 600' comprise transition regions 614, 614' positioned intermediate the high-density zones 624, 624' and the low-density zones 626, 626'. The transition regions 614, 614' run along at least a portion of a longitudinal length of the respective high-density zone 624, 624'.

When viewed from the direction of arrow A in FIG. 8A, the low-density zones 626 of the textured substrate 600 may appear as a series of substantially continuous or semicontinuous ridges extending outwardly from a surface plane $P_4$ of the textured substrate 600, in which the surface plane $P_4$ of the textured substrate 600 may be at least partially defined by the high-density zones 624. The low-density zones 626 of the textured substrate 600 of FIG. 8A may comprise an outer section 616 and sidewall sections 618 extending outwardly from the adjacent high-density zones 624 to the outer section 616 of the respective low-density zone 626. The high-density zones 624 of the textured substrate 600, when viewed from the direction of arrow A, may appear as a series of substantially continuous or semicontinuous planar sections 646. When viewed from the direction of arrow B in FIG. 8A, the low-density zones 626 of the textured substrate 600 may appear as a series of substantially continuous or semicontinuous troughs, and the high-density zones 624 may appear as a series of substantially continuous or semicontinuous planar areas 648. When viewed from either of the first side 602' or the second side 604', the low-density zones 626' of the textured substrate 600' depicted in FIG. 8B may appear as a series of substantially continuous or semicontinuous ridges extending outwardly from a surface plane $P_4'$ of the textured substrate 600', and the high-density zones 624' may appear as a series of substantially continuous or semicontinuous planar sections. The surface plane $P_4'$ may be at least partially defined by the high-density zones 624'.

The textured substrates 600, 600' depicted in FIGS. 7, 8A, and 8B may be formed using any of the processes described herein. For example, the textured substrates 600, 600' may be formed using one or more deflection members comprising a plurality of substantially continuous or semicontinuous raised portions and a plurality of substantially continuous or semicontinuous deflection conduits. The textured substrates 600, 600' may also be formed using an embossing and/or patterned calendering process, in which the patterns on the roll(s) form the corresponding substantially continuous or semicontinuous high-density and low-density zones 624, 624', 626, 626'. The textured substrates 600, 600' of FIGS. 8A and 8B may comprise polymer particles 620, 620', 630, 630' deposited on one or both of the first or second sides 602, 602', 604, 604'. Similar to the examples shown in FIGS.

3A-3C, the polymer particles 620, 620', 630, 630' in the exemplary textured substrates 600, 600' shown in FIGS. 8A and 8B may be deposited only on the first side 602, 602' of the textured substrate 600, 600', only on the second side 604, 604', or on both the first side 602, 602' and the second side 604, 604'.

Figure 9:
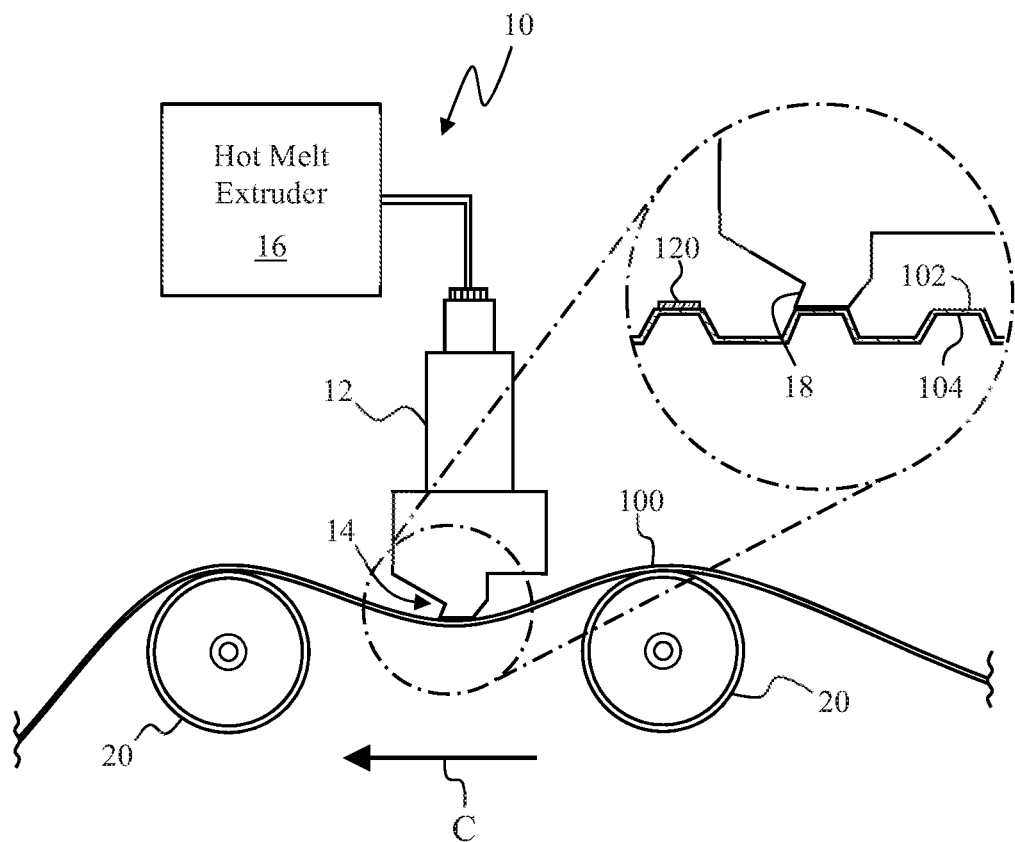
FIG. 9 is a schematic view of a slot coater.

In all examples described herein, the polymer particles may be deposited on the textured substrate 100 using a slot coater 10, as shown in FIG. 9, which may comprise a housing 12, a slot coat header 14, and a nozzle 18. The textured substrate 100 shown in FIG. 9 may represent any of the textured substrates described herein. The polymer particles 120 may likewise represent any of the polymer particles described herein. The slot coater 10 is coupled to a hot melt extruder 16, which supplies the slot coater 10 with a heated polymer (not separately labeled). The slot coat header 14 and nozzle 18 may be heated to a temperature that is substantially the same as the temperature of the heated polymer. The heated polymer is pumped from the hot melt extruder 16 and flows through the slot coat header 14 and nozzle 18 onto a surface of a textured substrate 100 at a substantially constant pressure and temperature to provide a consistent polymer flow rate onto the textured substrate 100. Driven rolls (not shown) move the textured substrate 100 in the direction indicated by the arrow C, and rollers 20 support the textured substrate 100 as the nozzle 18 presses into and deflects the textured substrate 100. The heated polymer is deposited by the nozzle 18 onto one side, e.g., the first side 102, of the textured substrate 100, and a plurality of polymer particles 120 are formed as the textured substrate 100 is passed across the nozzle 18 of the slot coat header 14.

The heated polymer is substantially deposited on an area of the textured substrate 100 that contacts the nozzle 18. In one example, with reference to FIGS. 2A, 2B, 3A, 3D, and 9, when the first side 102, 102' of the textured substrate 100, 100' is facing the nozzle 18, the area of the textured substrate 100, 100' that contacts the nozzle 18 comprises the discrete regions 106, 106', such that the heated polymer is substantially deposited onto the discrete regions 106, 106' when the textured substrate 100, 100' is passed across the nozzle 18 of the slot coat header 14.

As described herein, the heated polymer solidifies quickly, i.e., before the heated polymer is able to flow into the adjacent continuous region 108, 108', such that the polymer particles 120, 120' formed on the discrete regions 106, 106' do not extend to the adjacent continuous region 108, 108'. Further, because the heated polymer is deposited based on contact of the textured substrate 100, 100' with the nozzle 18 of the slot coat header 14, it is believed that little or no heated polymer is deposited on or flows to other areas of the textured substrate 100, 100' that do not contact the nozzle 18. For example, the heated polymer may be deposited on the discrete regions 106, 106' such that the polymer particles 120, 120' do not extend past the transition regions 114, 114' positioned intermediate the discrete regions 106, 106' and the adjacent continuous region 108, 108'. In some instances, a plurality of the discrete regions 106 and the corresponding discrete portions 110 may comprises high-density zones, and the continuous region 108 and corresponding continuous portion 112 may comprise a low-density zone, as shown in FIGS. 2A and 3A. In other instances, a plurality of the discrete regions 106' and the corresponding discrete portions 110' may comprises low-density zones, and the continuous region 108' and corresponding continuous portion 112' may comprise a high-density zone, as shown in FIGS. 2B and 3D. In other examples, the heated polymer is deposited only on the discrete regions 106, 106'.

In some particular examples, as described herein, the discrete regions 106, 106' may comprise an outer section 116, 116' and sidewall sections 118, 118' extending outwardly from the adjacent continuous region 108, 108' and from the respective surface plane $P_1$, $P_1'$ of the textured substrate 100, 100' to the outer section 116, 116' of the respective discrete region 106, 106'. In some instances, the heated polymer may be deposited only on the outer sections 116, 116' of the discrete regions 106, 106'. As shown in FIG. 3A, when the discrete regions 106 comprise a high-density zone 124 and the outer section 116 is substantially planar, the heated polymer may be deposited only on the substantially planar portion of the outer section 116. The substantially planar outer section 116 contacts the nozzle 18, and it is believed that little or no heated polymer is deposited on other areas of the textured substrate 100 that do not contact the nozzle 18, e.g., the sidewalls 118 or the adjacent continuous region 108. In some instances, when the high-density discrete regions 106 comprise a concave outer section 142, as shown in FIG. 2D, the heated polymer may be deposited along a perimeter (not labeled; see FIGS. 11A-C) of the concave outer section 142 and/or within the concave outer section 142. As shown in FIGS. 2B, 2C, and 3D, the outer section 116, 116' of the discrete region 106, 106' may comprise a dome-shaped outer section 140 (not separately labeled in FIGS. 2B and 3D), and the heated polymer may be substantially deposited on an outermost part of the dome-shaped outer section 140, i.e., an area of the outer portion 116, 116', 140 that is generally co-planar with the surface plane $P_1$, $P_1'$ of the respective textured substrate 100, 100'.

Figure 10:
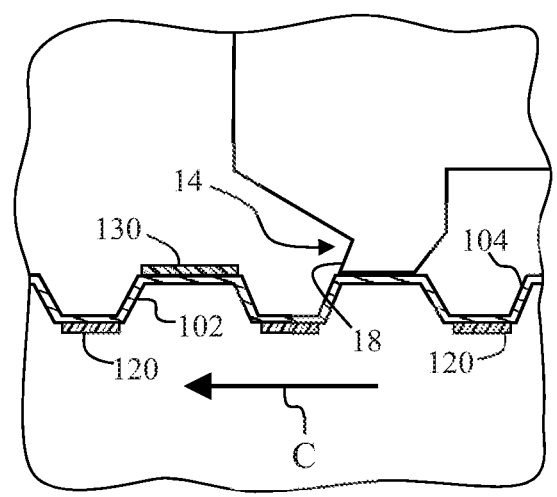
FIG. 10 is a detailed view of a portion of the slot coater of FIG. 9.

With reference to FIGS. 2A, 2B, 3B, and 3D, when the second side 104, 104' of the textured substrate 100, 100' is facing the nozzle 18, the area of the textured substrate 100, 100' that contacts the nozzle 18 comprises the continuous portion 112, 112', such that the heated polymer is substantially deposited onto the continuous portion 112, 112' when the textured substrate 100, 100' is passed across the nozzle 18 of the slot coat header 14 (see also FIG. 10). The polymer particles 130, 130' formed on the continuous portion 112, 112' do not extend to the adjacent discrete portion 110, 110'. Because the heated polymer is deposited based on contact with the textured substrate 100, 100', e.g., contact between the continuous portions 112, 112' and the nozzle 18 and solidifies quickly, it is believed that little or no heated polymer is deposited on or flows to other areas of the textured substrate 100, 100' that do not contact the nozzle 18. For example, the heated polymer may be deposited on the continuous portions 112, 112' such that the polymer particles 130, 130' do not extend past transition regions 114, 114' positioned intermediate the continuous portion 112, 112' and the adjacent discrete portions 110, 110'. In some instances, the continuous portion 112' and the continuous region 108' may comprise a high-density zone, and the discrete portions 110' and discrete regions 106' may comprise low-density zones, as shown in FIG. 3D. In other instances, the continuous portion 112 and continuous region 108 may comprise a low-density zone, and the discrete portion 110 and discrete region 106 may comprise high-density zones, as shown in FIG. 3B. In some particular examples, the heated polymer is deposited only on the continuous portion 112, 112'.

With reference to FIGS. 9 and 10, after the heated polymer is deposited on one side of the textured substrate 100, e.g., the polymer particles 120 are formed on the first side 102, the textured substrate 100 may be turned over and passed across the nozzle 18 of the slot coat header 14 a second time such that the heated polymer is deposited on the other side, e.g., the second side 104 of the textured substrate 100, to form the polymer particles 130, as described herein. It is to be understood that the polymer particles 130 may initially be formed on the second side 104 (see FIG. 3B), after which the textured substrate 100 may be turned over and the polymer particles 120 may then be formed on the first side 102, as described herein. In other examples (not shown), a second slot coater comprising a housing, a slot coat header, and a nozzle may be positioned opposite the slot coater 10 of FIGS. 9 and 10, such that heated polymer may be deposited on both sides 102, 104 of the textured substrate 100 without turning over the textured substrate 100.

In another example, as shown in FIGS. 6 and 9, the area of the textured substrate 400 that contacts the nozzle 18 of the slot coat header 14 may comprise the low-density zones 426, which extend outwardly from the surface plane $P_3$ on both sides 402, 404 of the textured substrate 400. The heated polymer is substantially deposited onto the low-density zones 426 when the textured substrate 400 is passed across the nozzle 18 of the slot coat header 14. In one example, with reference to FIGS. 5A and 6, the low-density zones 426 may comprise the continuous region 208 and the corresponding continuous portion 212. When the first side 202 of the textured substrate 200 of FIG. 5A is facing the nozzle 18, the heated polymer is substantially deposited on the low-density continuous region 208 to form polymer particles 420. When the second side 204 of the textured substrate 200 of FIG. 5A is facing the nozzle 18, the heated polymer is substantially deposited on the low-density continuous portion 212 to form polymer particles 430 (see also FIG. 10). In another example, with reference to FIGS. 5B and 6, the low-density zones 426 may comprise the discrete regions 206' and the corresponding discrete portions 210'. When the first side 202' of the textured substrate 200' of FIG. 5B is facing the nozzle 18, the heated polymer is substantially deposited on the low-density discrete regions 206' to form polymer particles 420. When the second side 204' of the textured substrate 200' of FIG. 5B is facing the nozzle 18, the heated polymer is substantially deposited on the low-density discrete portions 210' to form polymer particles 430 (see also FIG. 10).

With reference to FIGS. 6, 9, and 10, in all examples, the heated polymer may be deposited on the low-density zones 426 such that the polymer particles 420, 430 do not extend to the adjacent high-density zones 424. For example, the heated polymer may be deposited on the low-density zones 426 such that the polymer particles 420, 430 do not extend past the transition regions 414 positioned intermediate the low-density zones 426 and the adjacent high-density zones 424. In addition, after the heated polymer is deposited on one side of the textured substrate 400, e.g., the polymer particles 420 are formed on the first side 402, the textured substrate 400 may be turned over and passed across the nozzle 18 of the slot coat header 14 a second time such that the heated polymer is deposited on the other side, e.g., the second side 404 of the textured substrate 400, to form the polymer particles 430, as described herein. It is to be understood that the polymer particles 430 may initially be formed on the second side 404, after which the textured substrate 400 may be turned over and the polymer particles 420 may then be formed on the first side 402, as described herein. As described herein, a second slot coater (not shown) may be used to deposit heated polymer on both sides 402, 404 of the textured substrate 400 at substantially the same time.

In a further example, as shown in FIGS. 7, 8A, and 8B, the textured substrate 600, 600' may comprise a plurality of substantially continuous or semicontinuous, relatively high-density zones 624, 624' and a plurality of substantially continuous or semicontinuous, relatively low-density zones 626, 626'. With reference to FIGS. 8A and 9, when the first side 602 of the textured substrate 600 is facing the nozzle 18, the area of the textured substrate 600 that contacts the nozzle 18 comprises the low-density zones 626, such that the heated polymer is substantially deposited onto the low-density zones 626 when the textured substrate 600 is passed across the nozzle 18 of the slot coat header 14. The heated polymer may be substantially deposited onto the low-density zones 626 such that the polymer particles 620 do not extend to the adjacent high-density zones 624. Because the heated polymer is deposited based on contact of the textured substrate 600 with the nozzle 18 of the slot coat header 14 and solidifies quickly, it is believed that little or no heated polymer is deposited on or flows to other areas of the textured substrate 600 that do not contact the nozzle 20. For example, the heated polymer may be deposited on the low-density zones 626 such that the polymer particles 620 do not extend past the transition regions 614 positioned intermediate the low-density zones 626 and the adjacent high-density zones 624. In some particular examples, as described herein, the low-density zones 626 may comprise an outer section 616 and sidewall sections 618 extending outwardly from the adjacent high-density zones 624 and from the surface plane $P_4$ to the outer section 616 of the respective low-density zone 626. In some instances, the heated polymer may be deposited only on the outer sections 616 of the low-density zones 626. As shown in FIG. 8A, the outer section 616 of the low-density zones 626 may be dome-shaped, and the heated polymer may be substantially deposited on an outermost part of the dome-shaped outer section 616, i.e., the area of the outer portion 616 that is generally co-planar with the surface plane $P_4$ of the textured substrate 600.

With reference to FIGS. 8A and 10, when the second side 604 of the textured substrate 600 is facing the nozzle, the area of the textured substrate 600 that contacts the nozzle 18 comprises the high-density zones 624, such that the heated polymer is substantially deposited onto the high-density zones 624 when the textured substrate 600 is passed across the nozzle 18 of the slot coat header 14. Polymer particles 630 are formed on the high-density zones 624 and do not extend to the adjacent low-density zones 626. Because the heated polymer is deposited based on contact of the textured substrate 600 with the nozzle 18 and solidifies quickly, it is believed that little or no heated polymer is deposited on or flows to other areas of the textured substrate 600 that do not contact the nozzle 18. For example, the heated polymer may be deposited on the high-density zones 624 such that the polymer particles 630 do not extend past the transition regions 614 positioned intermediate the high-density zones 624 and the adjacent low-density zones 626. In some instances, the high-density zones 624 may define a substantially planar area 648 on the second side 604, and the heated polymer may be substantially deposited onto the substantially planar area 648 of the high-density zones 624.

With reference to FIGS. 8B and 9, the area that contacts the nozzle 18 of the slot coat header 14 may comprise the low-density zones 626', which extend outwardly from the surface plane $P_4'$ on both sides 602', 604' of the textured substrate 600'. The heated polymer is substantially deposited onto the low-density zones 626' when the textured substrate 600' is passed across the nozzle 18 of the slot coat header 14. When the first side 602' of the textured substrate 600' is facing the nozzle 18, the heated polymer is substantially deposited on the low-density zones 626' to form polymer particles 620'. When the second side 604' of the textured substrate 600' is facing the nozzle 18, the heated polymer is substantially deposited on the low-density zones 626' to form polymer particles 630'. The heated polymer may be deposited on the low-density zones 626' such that the polymer particles 620', 630' do not extend to the adjacent high-density zones 624', as described herein. For example, the heated polymer may be deposited on the low-density zones 626' such that the polymer particles 620', 630' do not extend past the transition regions 614, 614' positioned intermediate the low-density zones 626' and the adjacent high-density zones 624'.

In addition, with reference to FIGS. 8A, 8B, 9, and 10, after the heated polymer is deposited on one side of the textured substrate 600, 600', e.g., the polymer particles 620, 620' are formed on the first side 602, 602', the textured substrate 600, 600' may be turned over and passed across the nozzle 18 of the slot coat header 14 a second time such that the heated polymer is deposited on the other side, e.g., the second side 604, 604' of the textured substrate 600, 600', to form the polymer particles 630, 630', as described herein. It is to be understood that the polymer particles 630, 630' may initially be formed on the second side 604, 604', after which the textured substrate 600, 600' may be turned over and the polymer particles 620, 620' may then be formed on the first side 602, 602', as described herein. As described herein, a second slot coater (not shown) may be used to deposit heated polymer on both sides 602, 602', 604, 604' of the textured substrate 600, 600' at substantially the same time.

With reference to FIGS. 9 and 10, in all examples described herein, one or more segments of the nozzle 18 of the slot coat header 14 may be blocked such that the heated polymer is deposited only on one or more sections of the textured substrate 100 to form one or more patterns or designs. For example, a central segment of the nozzle 18 may be blocked so that the heated polymer is deposited only along one or both edges of the textured substrate 100 in the machine direction (MD). In another example, several discrete segments of the nozzle 18 may be blocked so that the heated polymer is deposited in MD stripes on the textured substrate 100. In other examples, solenoids (not shown) on the slot coat header 14 may be pulsed to achieve a pulsed flow rate of the heated polymer, as is known in the art.

In all examples described herein, each polymer particle may comprise a macro-shape or configuration and a micro-shape or configuration, in which the macro-shape/configuration refers to characteristics of the polymer particle as a whole and the micro-shape/configurations refers to characteristics of the polymer particle with respect to individual fibers or groups of fibers of the textured substrate on which the polymer particle is formed.

Figure 11A:
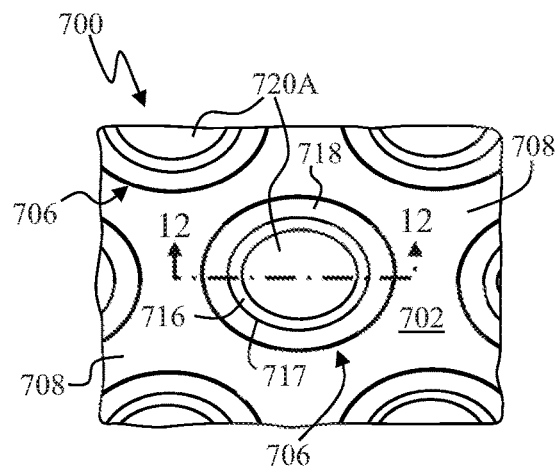
FIGS. 11A-11E are detailed plan views of a portion of a first side of an example textured substrates comprising polymer particles in accordance with the present disclosure.
Figure 11B:
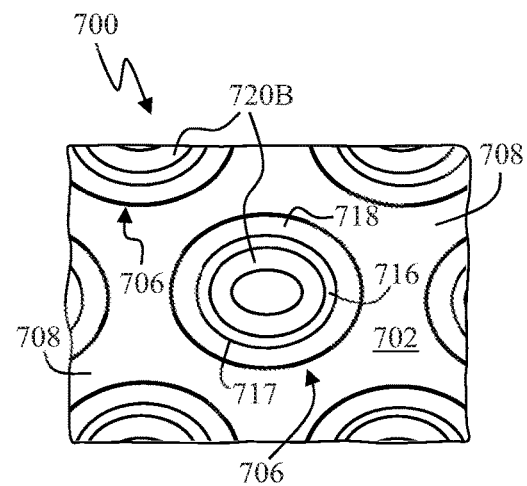
Figure 11C:
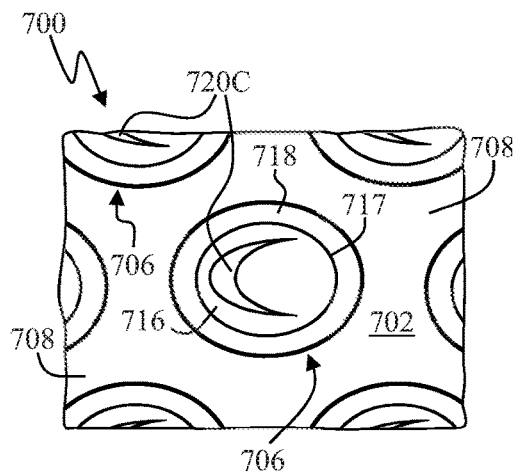
Figure 11D:
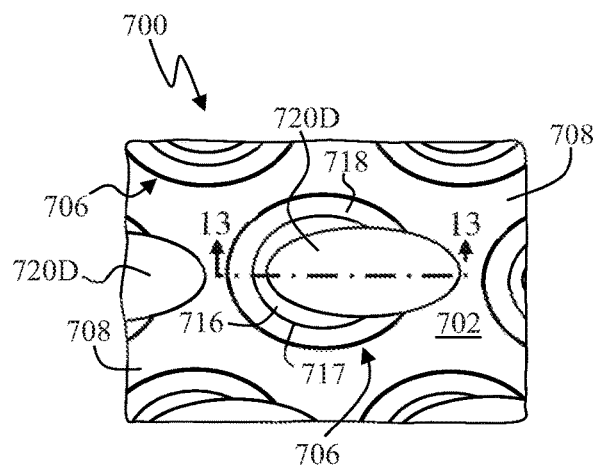
Figure 11E:
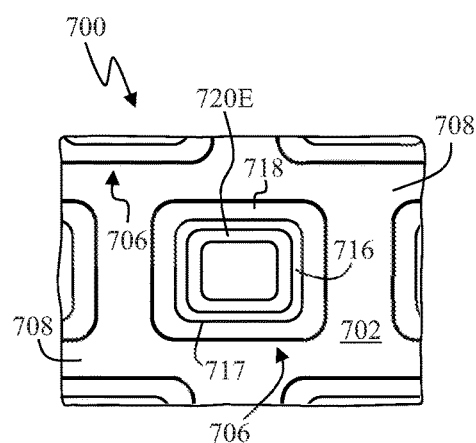
Figures 12A, 12B:
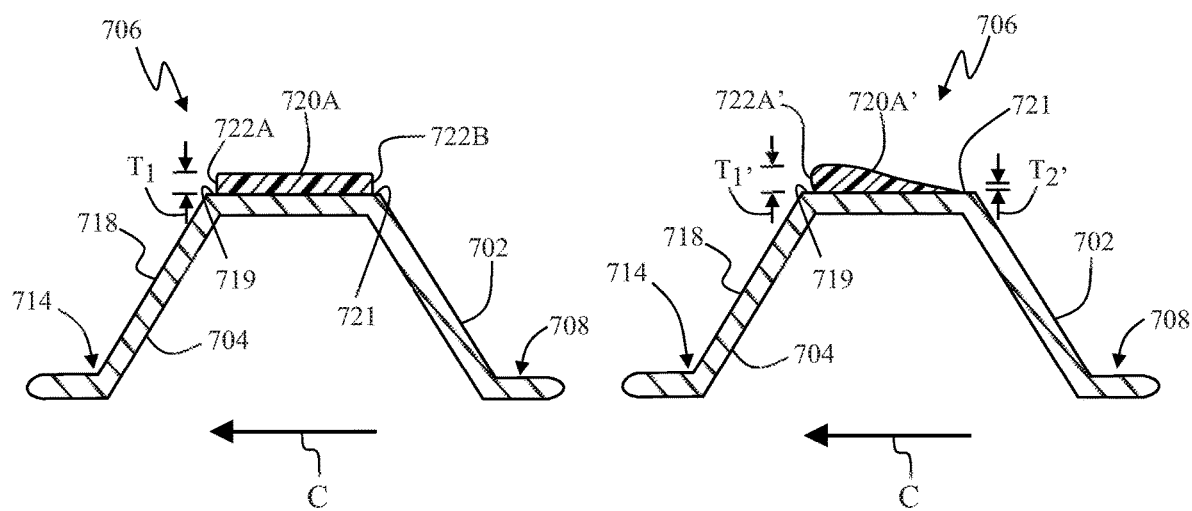
FIG. 12A is a cross-sectional view taken along the line 12-12 of one of the polymer particles of FIG. 11A.
FIG. 12B is a cross-sectional view, similar to FIG. 12A, of an additional example polymer particle in accordance with the present disclosure.
Figure 13:
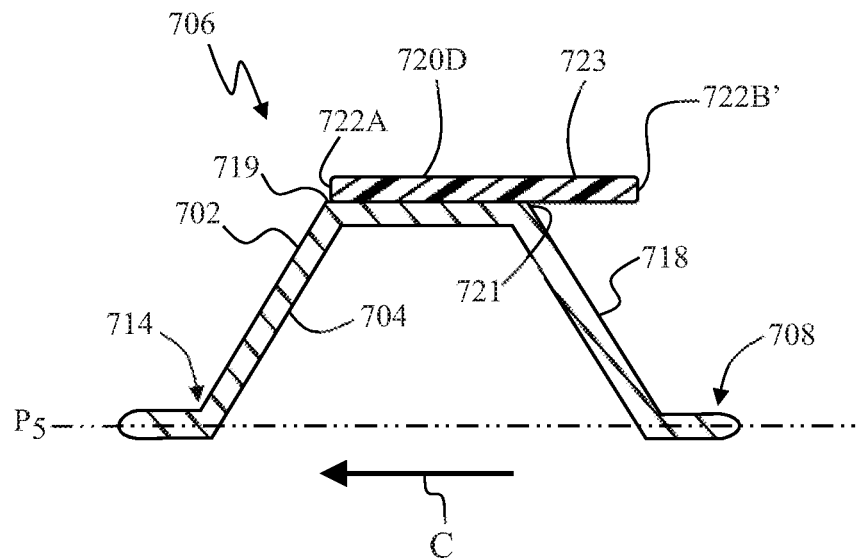
FIG. 13 is a cross-sectional view taken along line 13-13 of one of the polymer particles of FIG. 11D.

FIGS. 11A-11E are plan views of portions of a first side 702 of an exemplary one-ply textured substrate 700 according to the present disclosure. The textured substrate 700 comprises discrete regions 706 and a continuous region 708, in which the discrete regions 706 comprise polymer particles with a macro-shape comprising generally one of a disc shape 720A, a full ring 720B, 720E, a partial ring 720C, or a disc shape with an overhang 720D. FIG. 12A is a cross-sectional view taken along the line 12-12 of one of the polymer particles 720A depicted in FIG. 11A, and FIG. 12B is a cross-sectional view, similar to FIG. 12A, of an additional exemplary polymer particle 720A'. FIG. 13 is a cross-sectional view taken along line 13-13 of one of the polymer particles 720D depicted in FIG. 11D. While the cross-sectional shape of the discrete region 706 depicted in FIGS. 12A, 12B, and 13 most closely corresponds to the discrete region 106 depicted in FIG. 2A, the discrete regions 706 of FIGS. 11A-11E may also substantially correspond, for example, to the discrete regions 106, 106', 206' depicted in FIGS. 2B-2D and 5B and may comprise low-density or high-density zones, as described herein.

With reference to FIG. 11A-11E, each discrete region 706 may comprise an outer section 716 with a perimeter 717 along an outer edge of the outer section 716 and a sidewall section 718 extending outwardly from the adjacent continuous region 708 toward the outer section 716. The disc-shaped polymer particles 720A in FIG. 11A may substantially continuously cover at least a portion of the outer section 716, and in some examples, the disc-shaped polymer particles 720A may extend up to or near the perimeter 717 of the outer section 716. The polymer particles 720B, 720E with a full ring shape in FIGS. 11B and 11E may extend substantially continuously along the perimeter 717 of the outer section 717, in which a central portion (not separately labeled) of the outer section 716 is not covered by the polymer particle 720B, 720E. The polymer particles 720C with the partial ring shape in FIG. 11C are formed along a segment of the perimeter 717 of the outer section 716 and may comprise, for example, a horseshoe or crescent shape. The polymer particles 720D with a disc shape comprising an overhang 723 may substantially continuously cover at least a portion of the outer section 716, in which the overhang 723 may extend substantially horizontally from the outer section 716 of the discrete region 706, as described herein. As shown and as described herein, the macro-shape of the polymer particles 720A-720E may be at least partially determined by a shape of the outer section 716 of the discrete region 706. A feed direction of the textured substrate 700 through a slot coater (not shown; see FIGS. 9 and 10) is indicated by arrow C in FIGS. 12A, 12B, and 13.

With reference to FIGS. 11A, 12A, and 12B, at least a section of the polymer particle 720A, 720A' defines at least one raised edge 722A, 722A', 722B that is raised relative to a surface, i.e., the outer section 716, of the textured substrate 700 on which the polymer particle 720A, 720A' is formed (see also reference numbers 122, 122', 422 in FIGS. 3A, 3C, 3D, and 6). With reference to FIG. 12A, in some examples, at least a portion of the polymer particle 720A, in cross-section, may comprise a substantially uniform thickness $T_1$, and in some instances, may comprise the substantially uniform thickness $T_1$ across substantially an entirety of the polymer particle 720A from a leading edge 719 to a trailing edge 721 of the outer section 716 of the discrete region 706. The polymer particle 720A may define first and second raised edges 722A, 722B. With reference to FIG. 12B, in other examples, the polymer particle 720A', in cross-section, may comprise a thickness that varies across at least a portion of the polymer particle 720A' and may define one raised edge 722A'. For example, one portion of the polymer particle 720A' may comprise a first thickness $T_1'$ and another portion of the polymer particle 720A' may comprise a second thickness $T_2'$, in which $T_2'$ is less than $T_1'$. In some instances, the segment of the polymer particle 720A' nearest the leading edge 719 of the outer section 716 of the discrete region 706, e.g., the raised edge 722A', may comprise the first thickness $T_1'$ and the segment of the polymer particle 720A' that is located toward the trailing edge 721 of the outer section 716 of the discrete region 706 may comprise the second thickness $T_2'$. In some particular examples, as shown in FIG. 12B, the polymer particle 720A' with a varying thickness may comprise generally a teardrop or foil shape that tapers substantially continuously from the leading edge 719 of the outer section 716 of the discrete region 706 toward the trailing edge 721. The polymer particles comprising a full ring 720B, 720E or a partial ring 720C may comprise any of the cross-sectional profiles depicted in FIGS. 12A and 12B.

With reference to FIGS. 11D and 13, one portion of the polymer particle 720D near the leading edge 719 of the outer section 716 of the discrete region 706 defines a first raised edge 722A relative to the outer section 716 on which the polymer particle 720D is formed. The polymer particle 720D further comprises an overhang 723 extending from the trailing edge 721 of the outer section 716 of the outer section 716 of the discrete region 706. It is believed that at least a portion of the overhang 723 may extend substantially parallel to a surface plane $P_5$ of the textured substrate 700, in which the surface plane $P_5$ may be at least partially defined by the continuous region 708. While the overhang 723 may extend above the adjacent continuous region 708, it is believed that the polymer particle 720D does not extend to the continuous region 708, i.e., the polymer particle 720D is not deposited on and does not flow into the continuous region 708 during formation, as described herein. When the textured substrate 700 is fed through a slot coater (see FIGS. 9 and 10), the heated polymer deposited onto the discrete region 706 solidifies quickly and may form the overhang 723 based on the characteristics of the polymer and/or the operating parameters of the slot coater, as described herein. Further, because the heated polymer is deposited based on contact of the textured substrate 700 with the nozzle of the slot coat header (see FIG. 9), it is believed that little or no heated polymer is deposited on or flows to other areas of the textured substrate 700 that do not contact the nozzle. For example, it is believed that a portion (not shown) of the overhang 723 may extend to, contact, and/or coat a section of the sidewall 718 of the discrete region 706 that is located beneath the overhang 723 but without extending to or contacting the adjacent continuous region 708, i.e., without extending past the transition regions 714. As shown in FIG. 13, in some examples, it is believed at least a portion of the polymer particle 720D, in cross-section, may comprise a substantially uniform thickness (not labeled; see FIG. 12A), and in some instances, may comprise the substantially uniform thickness across substantially an entirety of the polymer particle 720D from the leading edge 719 to the trailing edge 721 of the outer section 716 of the discrete region 706. In other examples (not shown; see FIG. 12B), it is believed that the polymer particle 720D, in cross-section, may comprise a thickness that varies across at least a portion of the polymer particle 720D.

Figure 14:
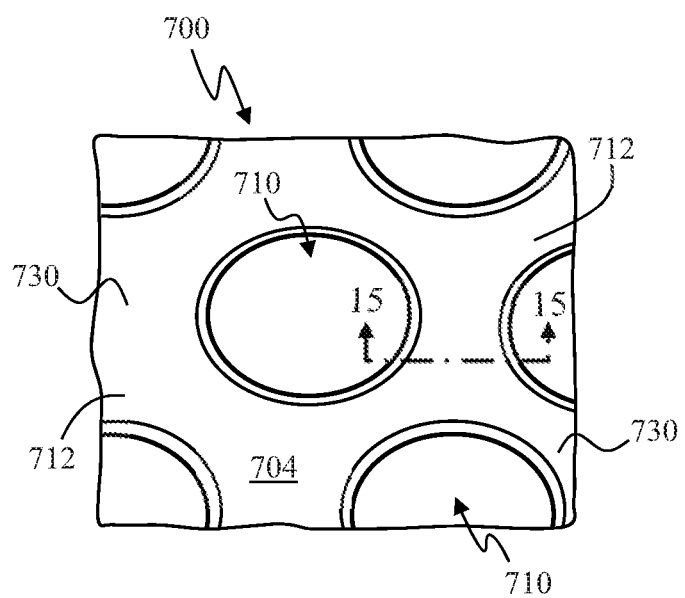
FIG. 14 is a detailed plan view of a portion of a second side of an example textured substrates comprising polymer particles in accordance with the present disclosure.
Figure 15A:
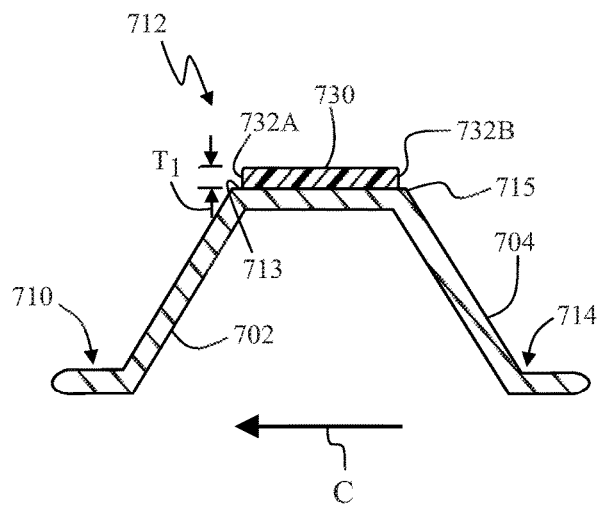
FIG. 15A is a cross-sectional view taken along the line 15-15 of one of the polymer particles of FIG. 14.
Figure 15B:
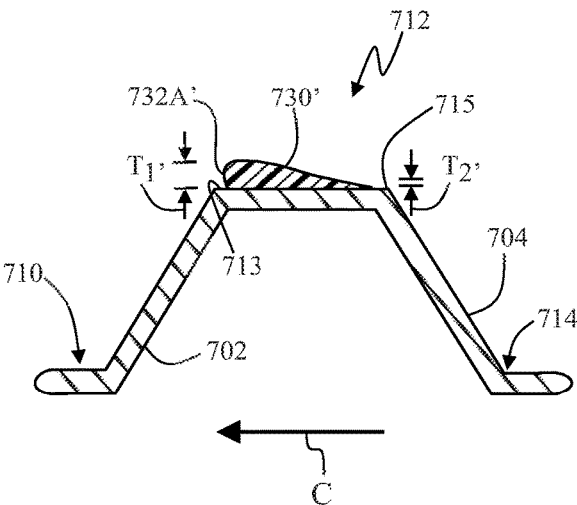
FIG. 15B is a cross-sectional view, similar to FIG. 15A, of an additional example polymer particle in accordance with the present disclosure.

FIG. 14 is a plan view of a portion of a second side 704 of a textured substrate 700 comprising discrete portions 710 and a continuous portion 712, in which the continuous portion 712 comprises polymer particles 730. FIG. 15A is a cross-sectional view taken along the line 15-15 of one of the polymer particles 730 depicted in FIG. 14, and FIG. 15B is a cross-sectional view, similar to FIG. 15A, of an additional exemplary polymer particle 730'. While the cross-sectional shape of the continuous portion 712 depicted in FIGS. 15A and 15B most closely corresponds to the continuous portion 112' shown in FIG. 2B, the continuous portion 712 of FIG. 14 may also substantially correspond, for example, to the continuous portions 112, 212 depicted in FIGS. 2A and 5A and may comprise low-density or high-density zones, as described herein. A feed direction of the textured substrate 700 through a slot coater (not shown; see FIGS. 9 and 10) is indicated by arrow C in FIGS. 15A and 15B.

Because the continuous portion 712 may generally comprise a semicontinuous or continuous grid or network, the macro-shape of the polymer particles 730, 730' formed on the continuous portion 712 may range from a shape that approximately follows the semicontinuous or continuous network, i.e., semicontinuous or continuous strips, to an amorphous shape. The macro-shape of the polymer particles 730, 730' may also be at least partially determined by an orientation of the textured substrate 700 with respect to the nozzle of the slot coater (not shown; see FIGS. 9 and 10).

As shown in FIGS. 15A and 15B, at least a section of each polymer particle 730, 730' defines at least one raised edge 732A, 732A', 732B, which is raised relative to a surface, i.e., the continuous portion 712, of the textured substrate 700 on which the polymer particle 730, 730' is formed (see also reference numbers 132, 132', 432 in FIGS. 3B-3D and 6). With reference to FIG. 15A, in some examples, at least a portion of the polymer particle 730, in cross-section, may comprise a substantially uniform thickness $T_1$, in some instances, may comprise the substantially uniform thickness $T_1$ across substantially an entirety of the polymer particle 730 from a leading edge 713 to a trailing edge 715 of the continuous portion 712. The polymer particle 730 may define first and second raised edges 732A, 732B. With reference to FIG. 15B, in other examples, the polymer particle 730', in cross-section, may comprise a thickness that varies across at least a portion of the polymer particle 730' and may define one raised edge 732A'. For example, one portion of the polymer particle 730' may comprise a first thickness $T_1'$, and another portion of the polymer particle 730' may comprise a second thickness $T_2'$, in which $T_2'$ is less than $T_1'$. In some instances, the segment of the polymer particle 730' nearest the leading edge 713 of the continuous portion 712, e.g., the raised edge 732A', comprises the first thickness $T_1'$, and the segment of the polymer particle 730' that is located toward the trailing edge 715 of the continuous portion 712 may comprise the second thickness $T_2'$. In some particular examples, as shown in FIG. 15B, the polymer particle 730' with a varying thickness may comprise generally a teardrop or foil shape 'that tapers substantially continuously from the leading edge 713 of the continuous portion 712 toward the trailing edge 715. Although not shown, it is believed that the polymer particles 730 formed on the continuous portion 712 may also comprise a structure similar to the polymer particle 720D comprising an overhang 723, as depicted in FIG. 13, in which the overhang would extend from the trailing edge 715 of the continuous portion 712 substantially parallel to a surface plane (not shown; see FIG. 2B) of the textured substrate 700.

Although not discussed in detail, the polymer particles 620, 620', 630, 630' formed on the textured substrate 600, 600' of FIGS. 7, 8A, and 8B comprising a plurality of substantially continuous or semicontinuous, relatively high-density zones 624, 624' and a plurality of substantially continuous or semicontinuous, relatively low-density zones 626, 626' may substantially correspond to any of the examples shown in FIGS. 11A-11E, 12A, 12B, 13, 14, 15A, and 15B. The macro-shape of the polymer particles 620, 620', 630, 630' may be at least partially defined by a shape of the high-density and/or low-density zones 624, 624', 626, 626' on which the polymer particles 620, 620', 630, 630' are formed. For example, polymer particles 620, 620' formed on the low-density zones 626, 626' of the first side 602, 602' of the textured substrate 600 may comprise continuous or semicontinuous strips that substantially conform to the substantially continuous or semicontinuous ridges formed by the low-density zones 626, 626'. Likewise, the polymer particles 630, 630' formed on the second side 604, 604' of the textured substrate, which may include the polymer particles 630 formed on the substantially planar areas 648 of the high-density zones 624 and the polymer particles 630' formed on the low-density zones 626', may comprise continuous or semicontinuous strips that substantially conform to the substantially continuous or semicontinuous ridges formed by the high-density zones 624 or the low-density zones 626'. In addition, the macro-shape of the polymer particles 620, 620', 630, 630' may be at least partially determined by an orientation of the textured substrate 600, 600' with respect to the nozzle of the slot coater (not shown; see FIGS. 9 and 10).

In all examples described herein, the micro-shape or configuration of the polymer particles 720A-720C, 720A', 730, 730' of FIGS. 11A-11E, 12A, 12B, 13, 14, 15A, 15B may comprise one or more of fiber-coated, in which the polymer particles 720A-720C, 720A', 730, 730' coat at least a portion of the individual fibers comprising the textured substrate 700, or fragmented, in which the polymer particles 720A-720C, 720A', 730, 730' span between individual fibers. The extent of fiber-coating and/or fragmentation may be dependent, at least in part, on whether the polymer particles 720A-720C, 720A', 730, 730' are formed on high-density zones or low-density zones. For example, it is believed that fiber-coating occurs in both high- and low-density zones, but in high-density zones where the fibers are densified, a greater proportion of the polymer particles 720A-720C, 720A', 730, 730' may comprise a fragmented micro-shape due to the closer proximity of the fibers. Low-density zones may generally comprise a greater proportion of polymer particles 720A-720C, 720A', 730, 730' comprising a fiber-coated micro-shape due to the greater distance between the fibers. The polymer particles as described herein may comprise, for example, polyethylene, polypropylene, polylactic acid, ethylene-vinyl acetate, and copolymers thereof. In other examples, the polymer particles may comprise biodegradable polymers such as polycaprolactone, thermoplastic starch, poly(3-hydroxybutyrate-co-3-hydroxyvalerate), as well as natural materials such as one or more waxes. Examples of suitable polymers may include, but are not limited to, Metocene® MF650Y (LyondellBasell) and Licocene® 4201 and 1302 (Clariant). In some instances, the heated polymer used to form the polymer particles may comprise one or more additional inorganic or organic materials. These additional materials may comprise one or more additives such as dye or other colorants, wetting agents, fillers, fluorescents, polymer toughening agents, perfumes, surfactants, or oils.

In all examples described herein, the characteristics of the polymer particles, in particular the micro- and macro-shape, may be controlled, at least in part, by a combination of the properties of the polymer(s) and/or polymer solution(s) selected for forming the polymer particles and/or the conditions under which the heated polymer is deposited onto the textured substrate. For example, a polymer having a specified rheology or rheological profile, surface energy, viscosity, crystallization temperature, and/or solidification rate may be selected to achieve polymer particles having a desired set of characteristics. In addition, a polymer flow rate, a temperature of the heated polymer and slot coater components, a contact surface area (e.g., the surface area of the textured substrate onto which the heated polymer is deposited), a feed speed of the textured substrate (e.g., a speed at which the textured substrate is passed across the nozzle of the slot coat header), a degree of engagement between the textured substrate and the nozzle of the slot coat header, and/or an amount of cooling applied to the textured substrate following formation of the polymer particles may be adjusted to achieve polymer particles having the desired set of characteristics.

In particular, a ratio of the polymer flow rate to the contact surface area of the textured substrate may be controlled to achieve polymer particles of a specific shape and thickness. A higher polymer flow rate and/or smaller contact surface area generally results in greater polymer coverage and thickness. For example, with reference to FIGS. 11A-11C and 11E, the disc-shaped polymer particles 720A that cover substantially an entirety of the outer section 716 of the discrete region 706 will generally require a higher polymer flow rate than the polymer flow rate required to generate the polymer particles having a full ring shape 720B, 720E or a partial ring shape 720C. In addition, a relatively large textured substrate contact surface area will generally result in polymer particles that cover less of the contact surface area, e.g., the polymer particles having the full ring shape 720B, 720E or the partial ring shape 720C (as compared to the formation of the disc-shaped polymer particles 720A on a relatively small contact surface area, assuming a constant polymer flow rate).

In particular, a combination of one or more of the ratio of the polymer flow rate to the contact surface area of the textured substrate, the feed speed of the textured substrate, and/or the degree of engagement between the textured substrate and the nozzle of the slot coat header may be used to control the cross-sectional thickness and shape of the polymer particles. With reference to FIGS. 12A and 15A, a polymer particle 720A, 730 comprising a substantially uniform thickness across substantially an entirety of the polymer particle 720A, 730 may be formed by selecting a ratio and a feed speed that cause a substantially uniform amount of the heated polymer to be deposited across the entirety of the contact surface area, e.g., from the leading edge 713, 719 to the trailing edge 715, 721 of respective outer section 716 of the discrete region 706 or continuous portion 712. In addition, or alternatively, a larger degree of engagement between the textured substrate and the nozzle may be used to ensure that a substantially consistent amount of heated polymer is deposited across the entirety of the contact surface area.

With reference to FIGS. 12B and 15B, a polymer particle 720A', 730' comprising a cross-sectional thickness that that varies across at least a portion of the polymer particle 720A', 730' may also be formed by selecting a ratio, a feed speed, and/or a degree of engagement that cause a greater amount of the heated polymer to be deposited at or near the leading edge 713, 719 of the outer section 716 of the discrete region 706 or the continuous portion 712, as compared to an amount of heated polymer deposited toward the trailing edge 715, 721. For example, the polymer flow rate may be selected such that excess polymer pools at the opening of the nozzle when the nozzle is not in contact with the textured substrate. The hot melt extruder (see FIG. 9) continues to supply the heated polymer at a constant rate, and the excess polymer is then deposited at the leading edge 713, 719 when the nozzle encounters the next discrete region 706 or continuous portion 712. In addition, or alternatively, polymer particles having a varying cross-sectional thickness may be achieved based on the degree of engagement between the textured substrate and the nozzle. For example, a smaller degree of engagement means that the excess polymer may be deposited at the leading edge 713, 719, after which the amount of polymer deposited on the remainder of the contact surface may be substantially uniform.

With reference to FIGS. 11D and 13, a polymer particle 720D comprising an overhang 723 may be achieved by selecting a ratio, a feed speed, and/or a degree of engagement that causes an excess amount of polymer to build up during deposition, which is then pushed or carried past the trailing edge 721 in a direction opposite to the arrow C and substantially parallel to the surface plane $P_5$. For example, it is believed that a high polymer flow rate, slower feed speed, and/or greater degree of engagement causes an excess of polymer to be deposited as the nozzle moves from the leading edge 719 of the outer section 716 of the discrete region 706 to the trailing edge 721. When the nozzle reaches the trailing edge 721 and the open space above the continuous region, it is believed that a portion of the excess polymer disengages from the nozzle to form the overhang 723.

The characteristics of the polymer particles may further be controlled, at least in part, by one or more properties of the polymer(s) and/or polymer solution(s) used to form the polymer particles. For example, a polymer or polymer solution with a higher surface energy and/or viscosity may form polymer particles that cover less of the contact surface area (e.g., the polymer particles with a full ring 720B, 720E or partial ring shape 720C in FIGS. 11B, 11C, and 11E) and/or may form polymer particles with a cross-sectional thickness that varies across at least a portion of the polymer particle, as shown in FIGS. 12B and 15B. A polymer or polymer solution with a lower surface energy and/or viscosity may be used to form polymer particles that cover a greater amount of the contact surface area (e.g., the disc-shaped polymer particles 720A in FIG. 11A) and/or may form polymer particles with a substantially uniform cross-sectional thickness, as shown in FIGS. 12A and 15A.

The example depicted in FIGS. 11D and 13 with disc-shaped polymer particles 720D comprising an overhang 723 may be created by controlling a variety of factors, including the ratio of the polymer flow rate to the contact surface area of the textured substrate 700, the feed speed, and a cooling rate of the heated polymer after the polymer is deposited on the textured substrate 700. For example, with reference to FIG. 13, it is believed that the overhang 723 may be formed by selecting a ratio that causes a substantial amount of the heated polymer to be deposited across the entirety of the contact surface, e.g., from the leading edge 719 to the trailing edge 721 of the outer section 716 of the discrete region 706, and selecting a feed speed that causes at least a portion of the heated polymer to be pushed or carried past the trailing edge 721 in a direction opposite to the arrow C and substantially parallel to the surface plane $P_5$, as described above. Immediately following deposition of the polymer particles 720D, the textured substrate 700 may be cooled (e.g., by application of a cooling airflow by a fan or other cooling device (not shown)) such that the polymer quickly solidifies and hardens in place to retain the overhang 723 of polymer material that does not extend to the continuous region 708.

Multi-Ply Fibrous Structures

Figure 16A:
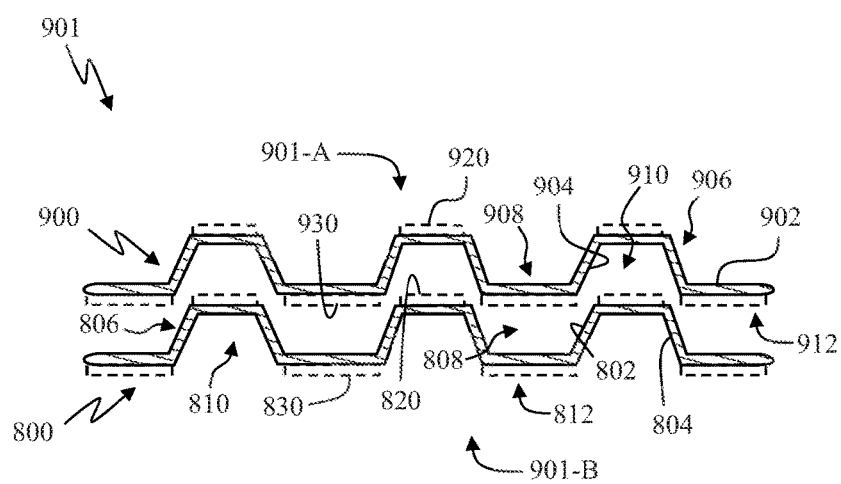
FIGS. 16A-16C are cross-sectional views of example fibrous structures with multiple plies of textured substrates comprising polymer particles in accordance with the present disclosure.
Figure 16B:
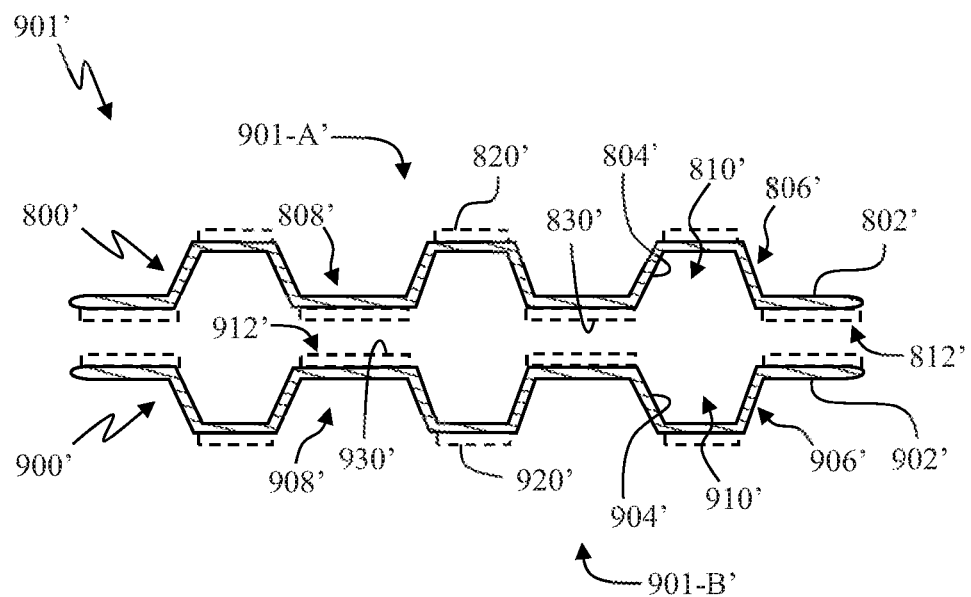
Figure 16C:
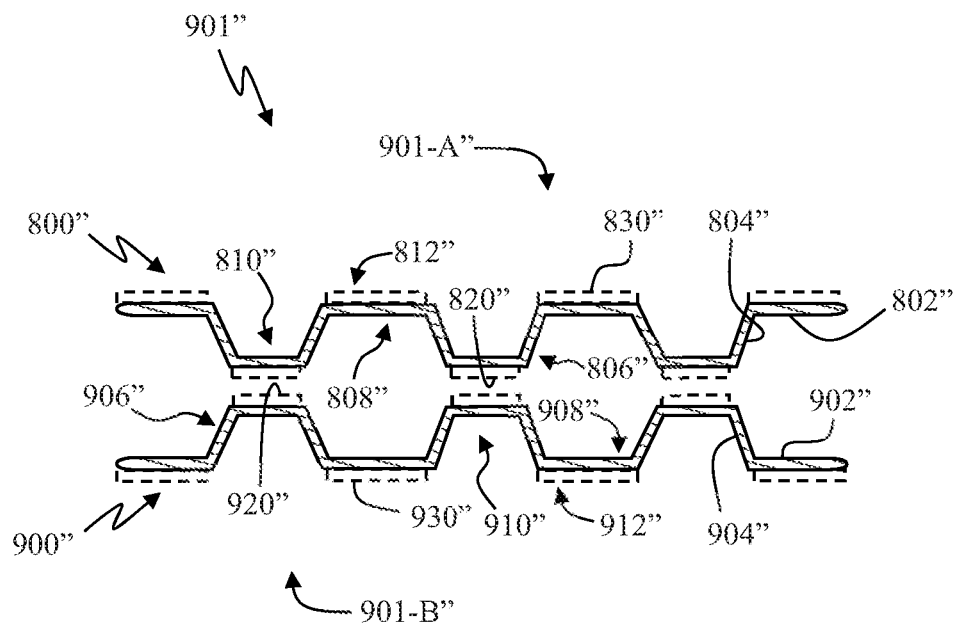

As shown in FIGS. 16A-16C, textured substrates according to the present disclosure may form one or more plies of a multi-ply fibrous structure 901, 901', 901". Each fibrous structure 901, 901', 901" may comprise a respective first ply comprising a first substrate 800, 800', 800" and a respective second ply that comprises a second substrate 900, 900', 900". The second substrate 900, 900', 900" may be joined to the first substrate 800, 800', 800" using, for example, a marrying roll to adhere the two substrates 800, 800', 800", 900, 901', 901" together, as described herein, or any other suitable method known in the art. An outermost ply may define first and second outer surfaces 901-A, 901-A', 901-A", 901-B, 901-B'. 901-B" of each respective fibrous structure 901, 901', 901".

Although the depictions of the first and second substrates 800, 800', 800", 900, 900', 900" of FIGS. 16A-16C may most closely correspond to the structure of the textured substrates 100, 100' of FIGS. 2A and 2B, the first and second substrates 800, 800', 800", 900, 900', 900" may represent any of the textured substrates described herein. In some examples, one of the first or second substrates 800, 800', 800", 900, 900', 900" may represent a conventional substrate that is not coated with polymer particles and in some instances, may lack texturing (i.e., the conventional substrate may comprise a substantially planar sheet that lacks discrete and continuous regions/portions as described herein). The polymer particles 820, 820', 820", 920, 920', 920", 830, 830', 830", 930, 930', 930" depicted in FIGS. 16A-16C may likewise represent any of the polymer particles described herein.

In addition, although the multi-ply fibrous structures 901, 901', 901" depicted in FIGS. 16A-16C comprise two plies, it is to be understood that the multi-ply fibrous structures 901, 901', 901" according to the present disclosure may comprise three plies, four plies, five plies, etc., and may comprise at least one textured substrate according to the present disclosure that is joined to one or more additional textured substrates according to the present disclosure and/or to one or more conventional substrates in any order and/or orientation, as described herein. In some examples, at least one ply may comprise a textured substrate according to the present disclosure and at least one other ply may comprise a conventional substrate. In other examples, all plies may comprise a textured substrate according to the present disclosure. As noted above, a fibrous structure of the present invention may also comprise a single-ply or textured substrate, such as any one of the textured substrates described above.

With reference to FIGS. 16A-16C, a first side 802, 802', 802" of each first substrate 800, 800', 800" (also referred to herein as a first textured substrate) may comprise first discrete regions 806, 806', 806" and a first continuous region 808, 808', 808" extending between the first discrete regions 806, 806', 806". A second side 804, 804', 804" of each first textured substrate 800, 800', 800" may comprise first discrete portions 810, 801, 810" corresponding to the first discrete regions 806, 806', 806" and a first continuous portion 812, 812', 812" corresponding to the first continuous region 808, 808', 808". The first textured substrates 800, 800', 800" may each comprise first polymer particles deposited on at least one of the first side 802, 802', 802" or the second side 804, 804', 804". In some examples, each of the first textured substrates 800, 800', 800" of FIGS. 16A-16C may comprise polymer particles 820, 820', 820" deposited on the first side 802, 802', 802" on the first discrete regions 806, 806', 806". In other examples, each of the first textured substrates 800, 800', 800" may comprise polymer particles 830, 830', 830" deposited on the second side 804, 804', 804" on the first continuous portion 812, 812', 812". In further examples, each of the first textured substrates 800, 800', 800" may comprise polymer particles 820, 820', 820", 830, 830', 830" deposited on both of the first and second sides 802, 802', 802", 804, 804', 804". At least a section of each of the first polymer particles 820, 820', 820", 830, 830', 830"

may define a raised edge, as described herein (not labeled; see FIGS. 12A, 12B, 13, 15A, and 15B).

In some particular instances, when the polymer particles 820, 820', 820" are deposited on the first side 802, 802', 802", the polymer particles 820, 820', 820" are deposited only on the first discrete regions 806, 806', 806". In other particular instances, the first discrete regions 806, 806', 806" may each comprise an outer section and sidewall sections (not labeled; see FIGS. 2A and 2B) extending outwardly from the adjacent first continuous region 808, 808', 808" to the outer section of the respective first discrete region 806, 806', 806". When the polymer particles 820, 820', 820" are deposited on the first side 802, 802', 802", the polymer particles 820, 820', 820" may be substantially deposited on the outer sections of the first discrete regions 806, 806', 806" and may not extend to the adjacent first continuous region 808, 808', 808", as described herein. In some examples, the polymer particles 820, 820', 820" may be deposited only on the outer sections of the first discrete regions 806, 806', 806".

In further particular instances, when the polymer particles 830, 830', 830" are deposited on the second side 804, 804', 804", the polymer particles 830, 830', 830" may be substantially deposited on the first continuous portion 812, 812', 812" and may not extend to the adjacent first discrete portions 810, 801, 810", as described herein. In some examples, when the polymer particles 830, 830', 830" are deposited on the second side 804, 804', 804", the polymer particles 830, 830', 830" may be deposited only on the first continuous portion 812, 812', 812".

In some examples, a plurality of the first discrete regions 806, 806', 806" and the corresponding first discrete portions 810, 801, 810" may comprise high-density zones and the first continuous region 808, 808', 808" and the corresponding first continuous portion 812, 812', 812" may comprise low-density zones, as described herein (not labeled; see FIGS. 2A and 2C-2E). In other examples, a plurality of the first discrete regions 806, 806', 806" and the corresponding first discrete portions 810, 801, 810" may comprise low-density zones and the first continuous region 808, 808', 808" and the corresponding first continuous portion 812, 812', 812" may comprise high-density zones, as described herein (not labeled; see FIG. 2B). The polymer particles 820, 820', 820", 830, 830', 830" may be substantially deposited on the high-density zones, low-density zones, or both (see FIGS. 3A-3D).

In further examples, one of (i) the first discrete regions 806, 806', 806" and the corresponding first discrete portions 810, 810', 810" or (ii) the first continuous region 808, 808', 808" and the corresponding first continuous portion 812, 812', 812" may comprise high-density zones, and the other of (i) the first discrete regions 806, 806', 806" and the corresponding first discrete portions 810, 810', 810" or (ii) the first continuous region 808, 808', 808" and the corresponding first continuous portion 812, 812', 812" may comprise low-density zones, in which the polymer particles 820, 820', 820", 830, 830', 830" may be substantially deposited on the low-density zones on one or both of the first side 802, 802', 802" or the second side 804, 804', 804" (see FIGS. 5A, 5B, and 6). In some particular examples, the polymer particles 820, 820', 820", 830, 830', 830" may be deposited only on the low-density zones (see FIG. 6)

With continued reference to FIG. 16A-16C, each of the second substrates 900, 900', 900" may comprise a third side 902, 902', 902" and a fourth side 904, 904', 904". In some examples, the second substrates 900, 900', 900" may comprise a conventional, uncoated substrate without polymer particles. In some instances, the second substrates 900, 900', 900" may comprise no texturing, i.e., the second substrates 900, 900', 900" may comprise a substantially planar sheet. In other instances, the second substrates 900, 900', 900" may comprise texturing (also referred to herein as a second textured substrate), in which the third side 902, 902', 902" of each second textured substrate 900, 900', 900" may comprise second discrete regions 906, 906', 906" and a second continuous region 908, 908', 908" extending between the second discrete regions 906, 906', 906" and the fourth side 904, 904', 904" of each second textured substrate 900, 900', 900" may comprise second discrete portions 910, 901, 910" corresponding to the second discrete regions 906, 906', 906" and a second continuous portion 912, 912', 912" corresponding to the second continuous region 908, 908', 908".

Each of the second textured substrates 900, 900', 900" may comprise second polymer particles deposited on at least one of the third side 902, 902', 902" or the fourth side 904, 904', 904". In some examples, each of the second textured substrates 900, 900', 900" may comprise polymer particles 920, 920', 920" deposited on the third side 902, 902', 902" on the second discrete regions 906, 906', 906". In other examples, each of the second textured substrates 900, 900', 900" may comprise polymer particles 930, 930', 930" deposited on the fourth side 904, 904', 904" on the second continuous portion 912, 912', 912". In further examples, each of the second textured substrates 900, 900', 900" may comprise polymer particles 920, 920', 920", 930, 930', 930" deposited on both of the third and fourth sides 902, 902', 902", 904, 904', 904". At least a section of each of the second polymer particles 920, 920', 920", 930, 930', 930" may define a raised edge, as described herein (not labeled; see FIGS. 12A, 12B, 13, 15A, and 15B).

In some particular instances, when the polymer particles 920, 920', 920" are deposited on the third side 902, 902', 902", the polymer particles 920, 920', 920" may be deposited only on the second discrete regions 906, 906', 906". In other particular instances, the second discrete regions 906, 906', 906" may each comprise an outer section and sidewall sections (not labeled; see FIGS. 2A and 2B) extending outwardly from the adjacent second continuous region 908, 908', 908" to the outer section of the respective second discrete region 906, 906', 906". When the polymer particles 920, 920', 920" are deposited on the third side 902, 902', 902", the polymer particles 920, 920', 920" may be substantially deposited on the outer sections of the second discrete regions 906, 906', 906" and may not extend to the adjacent second continuous region 908, 908', 908", as described herein. In some particular examples, the polymer particles 920, 920', 920" may be deposited only on the outer sections of the first discrete regions 906, 906', 906". In further particular instances, when the polymer particles 930, 930', 930" are deposited on the fourth side 904, 904', 904", the polymer particles 930, 930', 930" may be substantially deposited on the second continuous portion 912, 912', 912" and may not extend to the adjacent second discrete portions 910, 901, 910", as described herein. In some particular examples, when the polymer particles 930, 930', 930" are deposited on the fourth side 904, 904', 904", the polymer particles 930, 930', 930" may be deposited only on the second continuous portion 912, 912', 912".

In some examples, a plurality of the second discrete regions 906, 906', 906" and the corresponding second discrete portions 910, 901, 910" may comprise high-density zones and the second continuous region 908, 908', 908" and the corresponding second continuous portion 912, 912', 912" may comprise low-density zones, as described herein (not labeled; see FIGS. 2A and 2C-2E). In other examples, a plurality of the second discrete regions 906, 906', 906" and the corresponding second discrete portions 910, 901, 910" may comprise low-density zones and the second continuous region 908, 908', 908" and the corresponding second continuous portion 912, 912', 912" may comprise high-density zones, as described herein (not labeled; see FIG. 2B). The polymer particles 920, 920', 920", 930, 930', 930" may be substantially deposited on the high-density zones, low-density zones, or both (see FIGS. 3A-3D).

In further examples, one of (i) the second discrete regions 906, 906', 906" and the corresponding second discrete portions 910, 910', 910" or (ii) the second continuous region 908, 908', 908" and the corresponding second continuous portion 912, 912', 912" may comprise high-density zones, and the other of (i) the second discrete regions 906, 906', 906" and the corresponding second discrete portions 910, 910', 910" or (ii) the second continuous region 908, 908', 908" and the corresponding second continuous portion 912, 912', 912" may comprise high-density zones may comprise low-density zones, in which the polymer particles 920, 920', 920", 930, 930', 930" may be substantially deposited on the low-density zones on one or both of the first side 902, 902', 902" or the second side 904, 904', 904" (see FIGS. 5A, 5B, and 6). In some particular examples, the polymer particles 920, 920', 920", 930, 930', 930" may be deposited only on the low-density zones (see FIG. 6).

In yet further examples, the fibrous structures 900, 900', 900" may comprise a multi-ply structure in which at least one ply comprises a textured substrate having a plurality of substantially continuous or semicontinuous, relatively high-density zones and a plurality of substantially continuous or semicontinuous, relatively low-density zones, as described herein (see FIGS. 7, 8A, and 8B). The textured substrate may comprise polymer particles formed on at least one of a first side or a second side of the textured substrate, as described herein. The polymer particles may be substantially deposited on an area of the textured substrate that extends outwardly from a first surface plane of the textured substrate, and at least a section of each of the polymer particles may define a raised edge, as described herein. The polymer particles may be substantially deposited on the high-density zones, low-density zones, or both (see FIGS. 8A and 8B).

With reference to FIGS. 16A-16C, in some examples, when the polymer particles 820, 820', 820" are deposited on the first side 802, 802', 802" of the first textured substrate 800, 800', 800" and the first side 802, 802', 802" of the first textured substrate 800, 800', 800" is positioned directly adjacent to the second substrate 900, 900', 900", the first and second substrates 800, 800', 800", 900, 900', 900" may be oriented such that the polymer particles 820, 820', 820" are located within the fibrous structure 901, 901', 901". In other examples, when the polymer particles 820, 820', 820" are deposited on the first side 802, 802', 802" of the first textured substrate 800, 800', 800" and the second side 804, 804', 804" of the first textured substrate 800, 800', 800" is positioned directly adjacent to the second substrate 900, 900', 900", the first and second substrates 800, 800', 800", 900, 900', 900" may be oriented such that the polymer particles 820, 820', 820" are located on an outer surface 901-A, 901-A', 901-A", 901-B, 901-B', 901-B" of the fibrous structure 901, 901', 901". In further examples, when the polymer particles 830, 830', 830" are deposited on the second side 804, 804', 804" of the first textured substrate 800, 800', 800" and the second side 804, 804', 804" of the first textured substrate 800, 800', 800" is positioned directly adjacent to the second substrate 900, 900', 900", the first and second substrates 800, 800', 800", 900, 900', 900" may be oriented such that the polymer particles 830, 830', 830" are located within the fibrous structure 901, 901', 901". In yet further examples, when the polymer particles 830, 830', 830" are deposited on the second side 804, 804', 804" of the first textured substrate 800, 800', 800" and the first side 802, 802', 802" of the first textured substrate 800, 800', 800" is positioned directly adjacent to the second substrate 900, 900', 900", the first and second substrates 800, 800', 800", 900, 900', 900" may be oriented such that the polymer particles 830, 830', 830" are located on an outer surface 901-A, 901-A', 901-A", 901-B, 901-B'. 901-B" of the fibrous structure 901, 901', 901".

With continued reference to FIGS. 16A-16B, in some examples, when the polymer particles 920, 920', 920" are deposited on the third side 902, 902', 902" of the second substrate 900, 900', 900" and the third side 902, 902', 902" of the second substrate 900, 900', 900" is positioned directly adjacent to the first textured substrate 800, 800', 800", the first and second substrates 800, 800', 800", 900, 900', 900" may be oriented such that the polymer particles 920, 920', 920" are located within the fibrous structure 901, 901', 901". In other examples, when the polymer particles 920, 920', 920" are deposited on the third side 902, 902', 902" of the second substrate 900, 900', 900" and the fourth side 904, 904', 904" of the second substrate 900, 900', 900" is positioned directly adjacent to the first textured substrate 800, 800', 800", the first and second substrates 800, 800', 800", 900, 900', 900" may be oriented such that the polymer particles 920, 920', 920" are located on an outer surface 901-A, 901-A', 901-A", 901-B, 901-B'. 901-B" of the fibrous structure 901, 901', 901". In further examples, when the polymer particles 930, 930', 930" are deposited on the fourth side 904, 904', 904" of the second substrate 900, 900', 900" and the fourth side 904, 904', 904" of the second substrate 900, 900', 900" is positioned directly adjacent to the first textured substrate 800, 800', 800", the first and second substrates 800, 800', 800", 900, 900', 900" may be oriented such that the polymer particles 930, 930', 930" are located within the fibrous structure 901, 901', 901". In yet further examples, when the polymer particles 930, 930', 930" are deposited on the fourth side 904, 904', 904" of the second substrate 900, 900', 900" and the third side 902, 902', 902" of the second substrate 900, 900', 900" is positioned directly adjacent to the first textured substrate 800, 800', 800", the first and second substrates 800, 800', 800", 900, 900', 900" may be oriented such that the polymer particles 930, 930', 930" are located on an outer surface 901-A, 901-A', 901-A", 901-B, 901-B'. 901-B" of the fibrous structure 901, 901', 901".

With reference to FIG. 16A, in one example, the first and second substrates 800, 900 may be oriented such that the first side 802, 902 of one of the first or the second substrate 800, 900 is facing the second side 804, 904 of the other of the first or the second substrate 800, 900. In particular, the first and second substrates 800, 900 may be positioned such that the discrete regions 806, 906 of one of the first or the second substrate 800, 900 are facing the discrete portions 810, 910 of the other of the first or the second substrate 800, 900. In the example shown in FIG. 16A, the first substrate 800 is positioned such that the first side 802 of the first substrate 800 is facing the second side 904 of the second substrate 900, and the first discrete regions 806 of the first substrate 800 are facing the second discrete portions 910 of the second substrate 900. It is to be understood that the first and second substrates 800, 900 as described herein may also be oriented such that the first side 902 of the second substrate 900 is facing the second side 804 of the first substrate 800 and the second discrete regions 906 of the second substrate 900 are facing the first discrete portions 801 of the first substrate 800.

As shown in FIG. 16B, in another example, the first and second substrates 800', 900' may be oriented such that the second side 804' of the first substrate 800' is facing the second side 904' of the second substrate 900'. In particular, the first and second substrates 800', 900' may be positioned such that the first continuous portion 812' of the first substrate 800' is facing the second continuous portion 912' of the second substrate 900'.

As shown in FIG. 16C, in a further example, the first and second substrates 800", 900" may be oriented such that the first side 802" of the first substrate 800" is facing the first side 902" of the second substrate 900". In particular, the first and second substrates 800", 900" may be positioned such that the first discrete regions 806" of the first substrate 800" are facing the second discrete regions 906" of the second substrate 900".

In all examples of textured substrates and fibrous structures described herein, the polymer particles may comprise at least one raised edge with respect to the surface of the textured substrate on which the polymer particle is formed. By slot coating the polymer particles only onto certain areas of the textured substrate, the amount of raised edge per polymer particle may be maximized, while minimizing the amount of polymer required, controlling the macro-shape of the polymer particles, and preserving other desirable characteristics of the fibrous structure, as described herein. In some examples, the polymer particles may comprise a perimeter to area ratio of about 1,000 to about 18,000 $m^{-1}$. In some examples, it is believed that the perimeter to area ratio may be up to about 36,000 $m^{-1}$, and in further examples, it is believed that the perimeter to area ratio may be up to about 54,000 $m^{-1}$. The characteristics of selected polymer particles according to the present disclosure were measured in accordance with the methods described herein and are set out in the Examples and Table 1 below.

The raised edge(s) of the polymer particles provide enhanced cleaning, preferably without negatively impacting other characteristics of the fibrous structure comprising the textured substrate, such as absorbency, flexibility, and aesthetic properties. With respect to cleaning of stuck-on, dried, or adhered materials, conventional fibrous structures such as paper towels may become overly soft and flexible when wet and rely primarily on dissolving the dried material to loosen and dislodge it. The polymer particles of the present disclosure are fluid impervious and retain their ability to mechanically interact with the dried material. Thus, it is believed that fibrous structures according to the present disclosure exhibit superior cleaning ability when wet, while still retaining the consumer-desirable characteristics of conventional fibrous structures such as absorbency, tactile feel, visual appearance, etc. The characteristics of selected fibrous structures comprising textured substrates according to the present disclosure were measured in accordance with the methods described herein and are set out in Tables 2-4 below.

In all examples described herein, the polymer used to form the polymer particles may be selected to provide a polymer particle of a predetermined hardness. For example, the polymer particles according to the present disclosure may comprise a Vickers hardness of between about 4 $kg/mm^2$ to about 20 $kg/mm^2$, which may be measured as described herein. In some particularly examples, the polymer particle may comprise a Vickers hardness of about 7 $kg/mm^2$. It is believed that a polymer particle having a greater hardness may enhance the cleaning ability of the fibrous structure, while limiting the hardness of the polymer particles may mitigate the potential of the fibrous structure to cause damage to surfaces during cleaning.

Process for Making Textured Substrates

FIG. 17 illustrates an exemplary process for making a textured substrate according to the present disclosure. In one form, a deflection member (not shown) may be used in a papermaking process depicted in FIG. 17 for producing a textured substrate 500 of the present disclosure. The process comprises the following steps. First, a plurality of fibers 501 is provided and is deposited on a forming wire of a papermaking machine, as is known in the art. The present disclosure contemplates the use of a variety of fibers, such as, for example, cellulosic fibers, synthetic fibers, or any other suitable fibers, and any combination thereof. Papermaking fibers useful in the present disclosure include cellulosic fibers commonly known as wood pulp fibers. Fibers derived from soft woods (gymnosperms or coniferous trees) and hard woods (angiosperms or deciduous trees) are contemplated for use in this disclosure. The particular species of tree from which the fibers are derived is immaterial. The hardwood and softwood fibers may be blended, or alternatively, may be deposited in layers to provide a stratified web. U.S. Pat. Nos. 4,300,981 and 3,994,771 are incorporated herein by reference for the purpose of disclosing layering of hardwood and softwood fibers.

The wood pulp fibers may be produced from the native wood by any convenient pulping process. Chemical processes such as sulfite, sulfate (including the Kraft), and soda processes are suitable. Mechanical processes such as thermomechanical (or Asplund) processes are also suitable. In addition, the various semi-chemical and chemi-mechanical processes may be used. Bleached as well as unbleached fibers are contemplated for use. When the textured substrate of this disclosure is intended for use in absorbent products such as paper towels, bleached northern softwood Kraft pulp fibers may be used. Wood pulps useful herein include chemical pulps such as Kraft, sulfite and sulfate pulps as well as mechanical pulps including for example, ground wood, thermomechanical pulps and Chemi-ThermoMechanical Pulp (CTMP). Pulps derived from both deciduous and coniferous trees may be used.

In addition to the various wood pulp fibers, other cellulosic fibers such as cotton linters, rayon, and bagasse may be used in this disclosure. Synthetic fibers, such as polymeric fibers, may also be used. Elastomeric polymers, polypropylene, polyethylene, polyester, polyolefin, and nylon, may be used. The polymeric fibers may be produced by spunbond processes, meltblown processes, and other suitable methods known in the art. It is believed that thin, long, and continuous fibers produced by spunbond and meltblown processes may be beneficially used in the textured substrate of the present disclosure, because such fibers are believed to be easily deflectable into the pockets of the deflection member.

The paper furnish may comprise a variety of additives, including but not limited to fiber binder materials, such as wet strength binder materials, dry strength binder materials, chemical softening compositions, latexes, bicomponent fibers with a soften-able or melt-able outer shell, and thermoplastic fibers. Suitable wet strength binders include, but are not limited to, materials such as polyamide-epichlorohydrin resins sold under the trade name of KYMENE™ by Hercules Inc., Wilmington, Del. Suitable temporary wet strength binders include but are not limited to synthetic polyacrylates. A suitable temporary wet strength binder is PAREZ™ marketed by American Cyanamid of Stanford, Conn. Suitable dry strength binders include materials such as carboxymethyl cellulose and cationic polymers such as ACCO™ 711. The CYPRO/ACCO family of dry strength materials are available from CYTEC of Kalamazoo, Mich. Forms of fiber bonding may also be utilized, including, but not limited to, carding and hydroentangling.

The paper furnish may comprise a debonding agent to inhibit formation of some fiber to fiber bonds as the web is dried. The debonding agent, in combination with the energy provided to the web by the dry creping process, results in a portion of the web being debulked. In one form, the debonding agent may be applied to fibers forming an intermediate fiber layer positioned between two or more layers. The intermediate layer acts as a debonding layer between outer layers of fibers. The creping energy can therefore debulk a portion of the web along the debonding layer. Suitable debonding agents include chemical softening compositions such as those disclosed in U.S. Pat. No. 5,279,767. Suitable biodegradable chemical softening compositions are disclosed in U.S. Pat. Nos. 5,312,522; 5,279,767; and 5,312, 522. Such chemical softening compositions can be used as debonding agents for inhibiting fiber-to-fiber bonding in one or more layers of the fibers making up the web. One suitable softener for providing debonding of fibers in one or more layers of fibers forming the web is a papermaking additive comprising DiEster Di (Touch Hardened) Tallow Dimethyl Ammonium Chloride. A suitable softener is ADOGEN® brand papermaking additive available from Witco Company of Greenwich, Conn.

The embryonic web may be typically prepared from an aqueous dispersion of papermaking fibers, though dispersions in liquids other than water may be used. The fibers are dispersed in the carrier liquid to have a consistency of from about 0.1 to about 0.3 percent. In yet another alternative form, and without being limited by theory, it is believed that the present disclosure is also applicable to layered wires, structured wires, wet micro contraction, vacuum dewatering, airlaid structures, including air-laid webs comprising pulp fibers, synthetic fibers, and mixtures thereof.

Conventional papermaking fibers may be used and the aqueous dispersion may be formed in conventional ways. Conventional papermaking equipment and processes may be used to form the embryonic web on the Fourdrinier wire. The association of the embryonic web with the deflection member may be accomplished by simple transfer of the web between the wire and an endless belt, which may define the deflection member, as assisted by differential fluid pressure. The fibers may be deflected into the deflection member/belt by the application of differential fluid pressure induced by an applied vacuum and/or using a speed differential between the wire and the deflection member/belt. Any technique, such as the use of a Yankee drum dryer, may be used to dry the intermediate web. Foreshortening can be accomplished by any conventional technique such as creping.

The plurality of fibers may also be supplied in the form of a moistened fibrous web (not shown), which should preferably be in a condition in which portions of the web could be effectively deflected into the deflection conduits of the deflection member and the void spaces formed between the suspended portions and the X-Y plane.

The embryonic web comprising fibers 501 is transferred from a forming wire 123 to a belt 121, which may define the deflection member, via a vacuum pick-up shoe 148*a*. Alternatively or additionally, a plurality of fibers, or fibrous slurry, may be deposited onto the deflection member directly from a headbox or otherwise, including in a batch process, (not shown). The papermaking belt 121 defining the deflection member may travel past optional dryers/vacuum devices 148*b* and 148*c* and about rolls 119*a*, 119*b*, 119*k*, 119*c*, 119*d*, 119*e*, and 119*f* in the direction schematically indicated by the directional arrow "B".

Finally, a partly-formed textured substrate associated with the deflection member may be separated from the deflection member at roll 119*k* at the transfer to a Yankee dryer 128. By doing so, the deflection member, having the fibers thereon, is pressed against a pressing surface, such as, for example, a surface of a Yankee drying drum 128. After being creped off the Yankee dryer 128, a textured substrate 500 results and may be further processed or converted as desired. This process, alone or in combination with any additional processing step(s), e.g., embossing and/or patterned calendaring, may be used to form any of the textured substrates and fibrous structures described herein.

Process for Making Fibrous Structures

Figure 18:
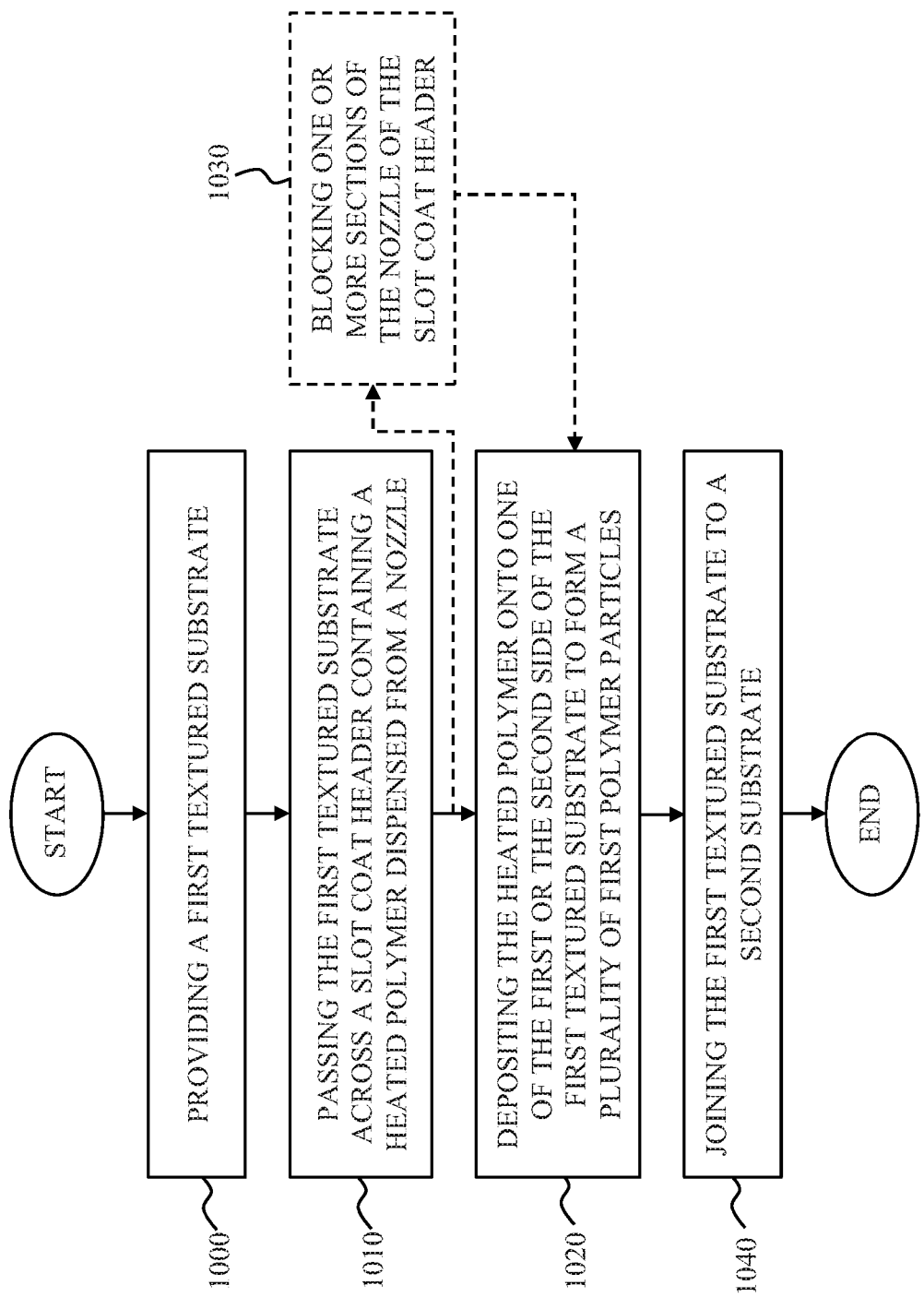
FIG. 18 is a flowchart illustrating an exemplary method for forming a fibrous structure comprising a textured substrate according to the present disclosure.

FIG. 18 is a flowchart illustrating an exemplary method for forming a fibrous structure comprising a textured substrate according to the present disclosure. Although reference is made to the components of the slot coater 10 and the textured substrate 100 of FIGS. 2A, 3A, 3B, 9, and 10, it is understood that the method is not limited only to these structures. The method may begin at Step 1000 with providing a first textured substrate. The first textured substrate may comprise any of the textured substrates described herein. With reference to FIG. 2A, the first textured substrate may be the textured substrate 100 and may comprise a first side 102 and a second side 104. The first side 102 may comprise first discrete regions 106 and a first continuous region 108 extending between the first discrete regions 106, and the second side 104 may comprise a plurality of first discrete portions 110 corresponding to the first discrete regions 106 and a first continuous portion 112 corresponding to the first continuous region 108. The method may continue at Step 1010 with passing the first textured substrate across a nozzle of a slot coat header, in which a heated polymer is dispensed from the nozzle. As shown in FIG. 9, a slot coater 10 may comprise a slot coat header 14 with a nozzle 18 that dispenses a heated polymer supplied by a hot melt extruder 16. The textured substrate 100 is supported by rollers 20 and is passed across the nozzle 18 of the slot coat header 14.

At step 1020, the heated polymer is deposited onto one of the first side or the second side of the first textured substrate to form a plurality of first polymer particles, in which the heated polymer is substantially deposited on an area of the first textured substrate that contacts the nozzle such that at least a section of each of the first polymer particles defines a raised edge. With reference to FIGS. 3A, 3B, 9, and 10, one of the first or second sides 102, 104 of the textured substrate 100 faces the nozzle 18, and as the textured substrate 100 is passed across the nozzle 18 of the slot coat header 14, the heated polymer is deposited on an area of the textured substrate 100 that contacts the nozzle 18 and polymer particles 120 or 130 are formed that define a raised edge 122 or 132, as described herein.

The method of FIG. 18 may optionally comprise blocking one or more sections of the nozzle of the slot coat header such that the heated polymer is deposited only on one or more sections of the first textured substrate at Step 1030. At step 1040, the first textured substrate is joined to a second substrate, after which the method may terminate.

With reference to FIGS. 3A and 9 and as described herein, in some examples, each first discrete region 106 of the first textured substrate 100 may comprise an outer section 116 and sidewall sections 118 extending outwardly from the adjacent first continuous region 108 to the outer section 116. When the first side 102 is facing the nozzle 18 of the slot coat header 14, the heated polymer may be substantially deposited onto the first discrete regions 106 such that the first polymer particles 130 do not extend to the adjacent first continuous region 108. In some particular examples, a plurality of the first discrete regions 106 and the corresponding first discrete portions 110 may comprise high-density zones 124 and the first continuous region 108 and the corresponding first continuous portion 112 may comprise low-density zones 126. In other particular examples, a plurality of the first discrete regions 106' and the corresponding first discrete portions 110' may comprise low-density zones 126' and the first continuous region 108' and the corresponding first continuous portion 112' may comprise high-density zones 124', as shown in FIG. 3D and as described herein. In further particular examples, depositing the heated polymer may comprise depositing the heated polymer only onto the first discrete regions 106, and more particularly, only onto the outer sections 116 of the first discrete regions 102. In yet further particular examples, when the second side 104 of the textured substrate 100 is facing the nozzle 18 of the slot coat header 14, the heated polymer may be deposited onto the first continuous portions 112 such that the first polymer particles 130 do not extend to adjacent first discrete portions 110.

In some examples, when the first side 102 of the textured substrate 100 is facing the nozzle 14, a plurality of the first polymer particles 120 may have generally one of a full ring, a partial ring, or a horseshoe shape, as described herein (see FIGS. 11A-11E). The first polymer particles 120 having generally the full ring shape may be formed along a perimeter of the outer section 116 of the respective first discrete region 106, and the first polymer particles 120 having generally the partial ring or the horseshoe shape may be formed along a segment of the perimeter of the outer section 116 of the respective first discrete region 106. In some instances, when the first side 102 is facing the nozzle 18, a plurality of the first polymer particles 120 may cover substantially an entirety of the outer section 116 of the respective first discrete region 106 (see FIG. 11A). In other instances, when the first side 102 is facing the nozzle 18, a plurality of the first polymer particles 120 may comprise an overhang extending from the outer section 116 of a respective first discrete region 106, wherein the overhang is substantially parallel to a first surface plane, e.g., surface plane $P_5$, of the first textured substrate 100 (see FIGS. 11D and 13). One or more characteristics of the polymer particle may be at least partially controlled by at least one of a rheology/rheological profile, surface energy, viscosity, or solidification rate of a polymer comprising the heated polymer, as described herein. One or more characteristics of the polymer particle may also be at least partially controlled by at least one of a polymer flow rate, a temperature of the heated polymer and slot coater components, a contact surface area, a feed speed of the textured substrate, or an amount of cooling applied to the textured substrate following formation of the polymer particles, as described herein.

In some aspects, the second substrate may comprise a second textured substrate, which may comprise any of the textured substrates described herein. The second textured substrate may comprise a third side with second discrete regions and a second continuous region extending between the second discrete regions and a fourth side comprising a plurality of second discrete portions corresponding to the second discrete regions and a second continuous portion corresponding to the second continuous region. The method for forming the fibrous structure may further comprise passing the second textured substrate across the nozzle of the slot coat header, in which the heated polymer is dispensed from the nozzle; and depositing the heated polymer onto one of the third or the fourth side of the second textured substrate to form a plurality of second polymer particles, in which the heated polymer is substantially deposited on an area of the second textured substrate that contacts the nozzle, such that at least a section of each of the second polymer particles defines a raised edge, as described herein (see FIGS. 9 and 10).

In some examples, at least one of the first textured substrate or the second textured substrate may be embossed as described herein. Embossing may occur prior to or after depositing the heated polymer to form the first and/or second polymer particles. In general, embossing deforms a section of the textured substrate such that the embossed section extends further outward from a surface plane of the textured substrate, as compared to the non-embossed sections of the textured substrate. When embossing occurs after depositing of the heated polymer, one or more of the protuberances used to form the embossing pattern may deflect/deform a section of the first and/or second textured substrate on which the first and/or second polymer particles are formed, such that the embossed section extends further outward from the surface plane of the textured substrate, as compared to the non-embossed sections. When embossing occurs before the heated polymer is deposited, at least a portion of the heated polymer may be deposited on the embossed sections, as these sections may contact the nozzle, as described herein.

In some instances, the first textured substrate may be joined to the second textured substrate such that the first discrete regions of the first textured substrate are facing the second discrete portions of the second textured substrate, as described herein (see FIG. 16A). In other instances, the first textured substrate may be joined to the second textured substrate such that the first continuous portion of the first textured substrate is facing the second continuous portion of the second substrate, as described herein (see FIG. 16B). In further instances, the first textured substrate may be joined to the second textured substrate such that the first discrete regions of the first textured substrate are facing the second discrete regions of the second textured substrate, as described herein (see FIG. 16C).

In some instances, the first textured substrate may be joined to the second textured substrate such that at least one of the first polymer particles or the second polymer particles is located within the fibrous structure, as described herein. In other instances, the first textured substrate may be joined to the second textured substrate such that at least one of the first polymer particles or the second polymer particles is located on an outer surface of the fibrous structure, as described herein. In further instances, the first textured substrate may be joined to the second textured substrate such that both of the first polymer particles and the second polymer particles are located within the fibrous structure, as described herein. In yet further instances, the first textured substrate may be joined to the second textured substrate such that both of the first polymer particles and the second polymer particles are located on an outer surface of the fibrous structure, as described herein (see FIGS. 16A-16C).

In some examples, the method may further comprise applying a cooling airflow following deposition of one or both of the first or the second polymer particles, as described herein. Also as described herein, the fibrous structure may comprise two plies, three plies, four plies, five plies, etc.

EXAMPLES

Fibrous structures comprising textured substrates according to the present disclosure were formed as described below and measurements were carried out to determine a shape and coverage of polymer particles formed on the textured substrates.

Example 1

A textured substrate similar to the textured substrate 100 depicted in FIG. 2A is formed, in which polymer particles are deposited on the first side on the high-density discrete regions. The textured substrate comprising polymer particles is then joined to a second, uncoated textured substrate to form a fibrous structure in which the discrete regions of the uncoated textured substrate face the discrete portions of the textured substrate comprising the polymer particles. The polymer particles are on an outside surface of the fibrous structure. The fibrous structure of this Example would correspond to a fibrous structure 901 of FIG. 16A, in which the first textured substrate 800 is uncoated and the second textured substrate 900 comprises polymer particles 920 on the third side 902.

Two, single-ply web substrates are unwound in the machine direction on separate generally parallel paths. The top substrate is oriented with the discrete regions facing out, and the bottom substrate is oriented with the continuous portions facing out.

A polypropylene polymer (Metocene® 650Y, Lyondell-Basell) is melted in a hot melt extruder (Nordson XP22 single-screw with gear pump) and pumped to a slot coat header (Nordson SCSE-375) with a heated 17" slot nozzle containing a 343 mm, 150 µm open shim. The slot coat header and nozzle are maintained at 200° C. A polymer flow rate of approximately 0.5 grams/second is maintained such that a coating load of approximately 1 gram per square meter is achieved with a web feed speed of 300 feet per minute.

The top single-ply web substrate is passed across the nozzle of the slot coat header with the discontinuous discrete regions being the top-most contacting point of the substrate with the nozzle. Due to the topography of the web substrate, the nozzle deposits molten polymer onto the specific locations of the web topography that are in closest contact with the nozzle edge. The deposits occur on the topmost surface protrusions of the web, i.e., the discrete regions and specifically the outer section of the discrete regions. Discrete particles are produced on the web.

The two single-ply webs continue on to the emboss and lamination unit where the non-coated substrate is embossed with an emboss roll against a pressure roll. This ply then receives glue or adhesive. The coated, second single ply web is brought into contact with the glue adhered side of the other web and married with a marrying roll into a two-ply sheet. In this Example, the polymer coating creates polymer particles on the outside of the fibrous structure.

Lines of termination may be added to the advancing substrate to form discrete sheets. Thus, a product may be manufactured by rolling, folding, stacking, cutting and placing in a package.

Measurements of the polymer particles formed on the coated substrate are taken using the methods described herein. The results of these measurements are set out in Table 1 below.

Example 2

A textured substrate similar to the textured substrate 100 depicted in FIG. 2A is formed, in which polymer particles are deposited on the first side on the high-density discrete regions. The textured substrate comprising polymer particles is then joined to a second, uncoated textured substrate to form a fibrous structure in which the discrete regions of the uncoated textured substrate face the discrete regions of the textured substrate comprising the polymer particles. The polymer particles are located within the fibrous structure. The fibrous structure of this Example would correspond to a fibrous structure 901" of FIG. 16C, in which the first textured substrate 800" is uncoated and the second textured substrate 900" comprises polymer particles 920" on the third side 902'.

Two, single-ply web substrates are unwound in the machine direction on separate generally parallel paths. Both substrates are oriented with the continuous portions facing out.

A polypropylene polymer (Metocene® 650Y, Lyondell-Basell) is melted in a hot melt extruder (Nordson XP22 single-screw with gear pump) and pumped to a slot coat header (Nordson SCSE-375) with a heated 17" slot nozzle containing a 343 mm, 150 µm open shim. The slot coat header and nozzle are maintained at 200° C. A polymer flow rate of approximately 0.5 grams/second is maintained such that a coating load of approximately 1 gram per square meter is achieved with a web feed speed of 300 feet per minute.

The bottom single-ply web substrate is passed across the nozzle of the slot coat header with the discrete regions being the top-most contacting point of the substrate with the nozzle. Due to the topography of the web substrate, the nozzle deposits molten polymer onto the specific locations of the web topography that are in closest contact with the nozzle edge. The deposits occur on the topmost surface protrusions of the web, i.e., the discrete regions and specifically the outer section of the discrete regions. Discrete particles are produced on the web.

The two single-ply webs continue on to the emboss and lamination unit where the coated substrate is embossed with an emboss roll against a pressure roll. This ply then receives glue or adhesive on the same side as the polymer coating. The second, single-ply web is brought into contact with the glue adhered side of the other web and married with a marrying roll into a two-ply sheet. In this Example, the polymer coating creates polymer particles that are on the inside of the textured substrate that first received embossing.

Lines of termination may be added to the advancing substrate to form discrete sheets. Thus, a product may be manufactured by rolling, folding, stacking, cutting and placing in a package.

Measurements of the polymer particles formed on the coated substrate are taken using the method described herein. The results of these measurements are set out in Table 1 below.

Example 3

A textured substrate similar to the textured substrate 100 depicted in FIG. 2A is formed, in which polymer particles are deposited on the second side on the low-density continuous portion. The textured substrate comprising polymer particles is then joined to a second, uncoated textured substrate to form a fibrous structure in which the discrete regions of the uncoated textured substrate face the discrete regions of the textured substrate comprising the polymer particles. The polymer particles are on an outside surface of the fibrous structure. The fibrous structure of this Example would correspond to a fibrous structure 901" of FIG. 16C, in which the first textured substrate 800" is uncoated and the second textured substrate 900" comprises polymer particles 930" on the fourth side 904".

Two, single-ply web substrates are unwound in the machine direction on separate generally parallel paths. Both substrates are oriented with the continuous portions facing out.

A polypropylene polymer (Metocene® 650Y, Lyondell-Basell) is melted in a hot melt extruder (Nordson XP22 single-screw with gear pump) and pumped to a slot coat header (Nordson SCSE-375) with a heated 17" slot nozzle containing a 343 mm, 150 μm open shim. The slot coat header and nozzle are maintained at 200° C. A polymer flow rate of approximately 0.5 grams/second is maintained such that a coating load of approximately 1 gram per square meter is achieved with a web feed speed of 300 feet per minute.

The bottom single-ply web substrate is passed across the nozzle of the slot coat header with the continuous portions being the top-most contacting point of the substrate with the nozzle. Due to the topography of the web substrate, the nozzle deposits molten polymer onto the specific locations of the web topography that are in closest contact with the nozzle edge, i.e., the continuous portions. The deposits occur on the topmost surface of the web that protrudes outward from the surface plane of the web. Transfer also occurs around individual fibers. Discrete particles are produced on the web.

The two single-ply webs continue on to the emboss and lamination unit where the coated substrate is embossed with an emboss roll against a pressure roll. This ply then receives glue or adhesive on the opposite side as the polymer coating. The second single-ply web is brought into contact with the glue adhered side of the other web and married with a marrying roll into a two-ply sheet. In this Example, the polymer coating creates polymer particles on the outside of the textured substrate that first received embossing.

Lines of termination may be added to the advancing substrate to form discrete sheets. Thus, a product may be manufactured by rolling, folding, stacking, cutting and placing in a package.

Measurements of the polymer particles formed on the coated substrate are taken using the method described herein. The results of these measurements are set out in Table 1 below.

Example 4

A textured substrate similar to the textured substrate 100A depicted in FIG. 2E is formed, in which the low-density continuous portion comprises 10% more surface area, as compared to the textured substrates in Examples 1-3, and in which polymer particles are deposited on the second side on the continuous portion. The textured substrate comprising polymer particles is then joined to a second, uncoated textured substrate to form a fibrous structure in which the discrete regions of the uncoated textured substrate face the discrete regions of the textured substrate comprising the polymer particles. The polymer particles are located on an outside surface of the fibrous structure. The fibrous structure of this Example would correspond to a fibrous structure 901" of FIG. 16C, in which the first textured substrate 800" is uncoated and the second textured substrate 900" comprises polymer particles 930" on the fourth side 904".

Two, single-ply web substrates comprising continuous portions with 10% more contact surface area are unwound in the machine direction on separate generally parallel paths. Both substrates are oriented with the continuous portions facing out.

A polypropylene polymer (Metocene® 650Y, Lyondell-Basell) is melted in a hot melt extruder (Nordson XP22 single-screw with gear pump) and pumped to a slot coat header (Nordson SCSE-375) with a heated 17" slot nozzle containing a 343 mm, 150 μm open shim. The slot coat header and nozzle are maintained at 200° C. A polymer flow rate of approximately 0.5 grams/second is maintained such that a coating load of approximately 1 gram per square meter is achieved with a web feed speed of 300 feet per minute.

The bottom single-ply web substrate is passed across the nozzle of the slot coat header with the continuous portion being the top-most contacting point of the substrate with the nozzle. Due to the topography of the web substrate, the nozzle deposits molten polymer onto the specific locations of the web topography that are in closest contact with the nozzle edge, i.e., the continuous portions. The deposits occur on the topmost surface of the web that protrudes outward from the surface plane of the web. Transfer also occurs around individual fibers. Discrete particles are produced on the web.

The two single-ply webs continue on to the emboss and lamination unit where the coated substrate is embossed with an emboss roll against a pressure roll. This ply then receives glue or adhesive on the opposite side as the polymer coating. The second single-ply web is brought into contact with the glue adhered side of the other web and married with a marrying roll into a two-ply sheet. In this Example, the polymer coating creates polymer particles on the outside of the textured substrate that first received embossing.

Lines of termination may be added to the advancing substrate to form discrete sheets. Thus, a product may be manufactured by rolling, folding, stacking, cutting and placing in a package.

Measurements of the polymer particles formed on the coated substrate are taken using the method described herein. The results of these measurements are set out in Table 1 below.

Example 5

A first textured substrate similar to the textured substrate 100 depicted in FIG. 2A is formed, in which first polymer particles are deposited on the first side on the high-density first discrete regions. The first textured substrate is then joined to a second, textured substrate having a similar configuration in which second polymer particles are deposited on the high-density second discrete regions. A fibrous structure is formed in which the continuous portions of the first textured substrate face the continuous portions of the second textured substrate. The polymer particles are on both outside surfaces of the fibrous structure. The fibrous structure of this Example would correspond to a fibrous structure 901' of FIG. 16B, in which the first textured substrate 800' comprises polymer particles 820' on the first side 802' and the second textured substrate 900' comprises polymer particles 920' on the third side 902'.

One, single ply web is unwound in the machine direction and oriented with the discrete regions facing out.

A polypropylene polymer (Metocene® 650Y, Lyondell-Basell) is melted in a hot melt extruder (Nordson XP22 single-screw with gear pump) and pumped to a slot coat header (Nordson SCSE-375) with a heated 17" slot nozzle containing a 343 mm, 150 μm open shim. The slot coat header and nozzle are maintained at 200° C. A polymer flow rate of approximately 0.5 grams/second is maintained such that a coating load of approximately 1 gram per square meter is achieved with a web feed speed of 300 feet per minute.

The single-ply textured substrate is passed across the nozzle of the slot coat header with the discrete regions being the top-most contacting point of the substrate with the nozzle. Due to the topography of the web substrate, the nozzle deposits molten polymer onto the specific locations of the web topography that are in closest contact with the nozzle edge. The deposits occur on the top most surface protrusions of the web, i.e., the first discrete regions and specifically the outer section of the first discrete regions. Transfer also occurs around the edge and on the leading edge of the protrusions. Discrete particles are produced on the web.

The single-ply coated (first) web is rewound on a parent roll core. This single-ply roll is returned to the bottom unwind stand and placed so as to unwind with the protrusions, i.e., the discrete regions, facing out. A second uncoated single-ply textured substrate is placed in the top unwind stand and oriented to unwind with the discrete regions facing out. Both substrates are unwound in the machine direction on separate generally parallel paths.

The top single-ply web substrate is passed across the nozzle of the slot coat header with the discrete regions being the top-most contacting point of the substrate with the nozzle. Due to the topography of the web substrate, the nozzle deposits molten polymer onto the specific locations of the web topography that are in closest contact with the nozzle edge. The deposits occur on the top most surface protrusions of the web, i.e., the second discrete regions and specifically the outer section of the second discrete regions. Transfer also occurs around the edge and on the leading edge of the protrusions. Discrete particles are produced on the web.

The two single-ply coated webs continue on to the emboss and lamination unit where the bottom (first) web substrate is embossed with an emboss roll against a pressure roll. This ply then receives glue or adhesive on the opposite side as the polymer coating. The second single-ply web is brought into contact with the glue adhered side of the other web. The second web is also oriented so the glue contacts the side opposite the polymer coating. The two plies are married with a marrying roll into a two-ply sheet. In this Example the polymer coating creates polymer particles that are on both of the outside surfaces of the two-ply fibrous structure.

Lines of termination may be added to the advancing substrate to form discrete sheets. Thus, a product may be manufactured by rolling, folding, stacking, cutting and placing in a package.

Methods for Measuring Polymer Particle Shape and Coverage

Polymer particles formed as described in Examples 1-4 above are characterized by analyzing an image of the substrate prototype in which the polymer material is visually distinct from the supporting substrate.

Methods to produce such an image may include:

(1) adding a UV tracer (such as Tinopal OB, ex. BASF at 0.5 g/kg polymer) to the polymer blend prior to the melting and coating process. The substrate can be captured in a UV light box (such as a UV-capable DigiEye, ex. Verivide, UK) with a camera and macro lens mounted (such as a Nikon D7000 with Sigma 105 mm DG Macro MSM lens) using exposure settings that are appropriate for the tracer level (such as ISO 500, 2.5 s shutter speed, f2.5 aperture, active D lighting disabled, capturing a RAW image) and a fixed focus at the appropriate focal length for the substrate; or (2) NIR mapping of the image using a suitable instrument (such as the Hyperion 3000 from Bruker).

If needed, the ply and side of the substrate that comprises the polymer coating must first be exposed to the imaging device prior to capture, including separating the plies if the polymer coating is within the laminated structure.

Analysis of the images can be conducted using appropriate particle image analysis software such as that provided with the Morphologi G3 particle analyzer instrument (ex. Malvern Instruments, UK); using the Measure Image File functionality, with the following settings for the above image example: version 8.12, inverted image, lower threshold 0, upper threshold 80, particles of more than 25 pixels included in analysis, Analysis ID 3.00, hole-filling disabled.

Measurement of the total substrate image area is calculated from imaging of a distance standard and calibration vs. pixel size. Microns per pixel is calculated as (horizontal width of distance standard visible in image in millimeters)/(horizontal length of image in pixels)×1000.

Size and shape parameters of each two-dimensional particle projection (with x and y axes in the same plane as the paper substrate) identified by the image analysis are calculated using the ID 3.00 algorithm of the Morphologi software (v. 8.12, Malvern, UK).

The Circle-Equivalent Diameter (CED), or Area-Equivalent Diameter (ISO 9276-6:2008(E) section 7), or Equivalent Circle Diameter (ASTM F1877-05 Section 11.3.2) is defined as the diameter of the circle that would have the equivalent area to the particle projection.

Solidity is a quantitative, two-dimensional image analysis shape description, described by ISO 9276-6:2008(E) section 8.2. Solidity values range from 0 to 1, where a solidity number of 1 describes a non-concave particle projection (such as a circle), as measured in literature as being:

Solidity=$A/Ac$ where A is the area of the particle and Ac is the area of the convex hull (envelope) of bounding the particle. The solidity decreases towards zero with increasing 'spikiness' of the particle.

Convexity is another quantitative measure (described in ISO 9276-6), which describes how 'spiky' the particle projection is (convexity=Pc/P, where P is the length of the perimeter of the particle and Pc is length of the perimeter of the convex hull (envelope) bounding the particle).

Circularity is a quantitative, two-dimensional image analysis shape parameter described by ISO 9276-6:2008(E) section 8.2, describing the ratio of the circumference of a circle equal to the object's projected area to the perimeter of the object. This can be represented by:

$$C = \sqrt{\frac{4\pi A}{P^2}}$$

where A is projection area and P is the length of the perimeter of the particle projection. Circularity values range from 0 to 1, where a circularity of 1 describes a perfectly circular projection.

Edge or perimeter to area ratio is defined as: ((number-based mean perimeter of particles analyzed)×(number of particles analyzed))/((number-based mean projected area of particles analyzed)×(number of particles analyzed)).

Particle coverage describes the proportion of the surface plane that is coated with polymer particles and is defined as: ((number-based mean projected area of particles analyzed)×(number of particles analyzed))/(total substrate area of samples analyzed).

Aspect ratio of a particle is calculated as particle width/particle length. Width and length are defined as follows: The major axis passes through the center of mass of the object at an orientation corresponding to the minimum rotational energy of the shape. It is also termed the orientation. The minor axis passes through the center of mass at right angles to the major axis. Lines from all points on the perimeter are projected onto the major axis of the particle. The longest distance between the points where two of these projections meet the axis is defined as the length of the particle. Lines from all points on the perimeter are projected onto the minor axis of the particle. The longest distance between the points where two of these projections meet the axis is defined as the width of the particle.

In each of these measurements, multiple analyses may be conducted across multiple images or replicates, with particle statistics and substrate areas being combined as appropriate.

For each of these parameters, distributions from multiple replicate images are combined to a single distribution, and area-weighted means are analyzed and reported. The results of these measurements are set out in Table 1 below.

TABLE 1

|  | CE Diameter (μm) | Circularity | Convexity | Solidity | Aspect Ratio | Particle coverage % | Perimeter/ Area [m$^{-1}$] |
| --- | --- | --- | --- | --- | --- | --- | --- |
| Example 1 | 1063 | 0.81 | 0.93 | 0.93 | 0.72 | 14.9% | 7024 |
| Example 2 | 743 | 0.81 | 0.94 | 0.92 | 0.70 | 9.7% | 8954 |
| Example 3 | 400 | 0.77 | 0.95 | 0.93 | 0.68 | 1.3% | 17823 |
| Example 4 | 1980 | 0.75 | 0.92 | 0.90 | 0.67 | 20.6% | 7881 |
| Control (no polymer) | N/A | N/A | N/A | N/A | N/A | 0.0% | N/A |

Tables 2-4 below sets out performance data for several textured substrates according to the present disclosure. One to three samples of each textured substrate were tested. In Tables 2-4, the fibrous structures of Examples 1-1, 1-2, and 1-3 comprise the structure set out in Example 1 above; the fibrous structure of Examples 2-1, 2-2, and 2-3 comprise the structure set out in Example 2 above; the fibrous structure of Examples 3-1 and 3-2 comprise the structure set out in Example 3 above; and the fibrous structures of Examples 4-1 and 4-2 correspond to the structure set out in Example 4 above.

The fibrous structures of Example 5 in Tables 2-4 comprise a textured substrate similar to the textured substrate 100' of FIG. 2B, in which polymer particles are deposited on the first side on the low-density discrete regions. The textured substrate comprising polymer particles is joined to a second, uncoated substrate such that the discrete regions of the textured substrate comprising the polymer particles face the discrete regions of the uncoated textured substrate and the polymer particles are located within the fibrous structure. The fibrous structures of Example 5 would correspond to a fibrous structure 901" of FIG. 16C in which the first textured substrate 800" is uncoated and the second textured substrate 900" comprises polymer particles 920" on the third side 902".

The fibrous structures of Example 6 comprise a textured substrate similar to the textured substrate 100' of 2B, in which polymer particles are deposited on the second side on the high-density continuous portions. The textured substrate comprising polymer particles is joined to a second, uncoated substrate such that the discrete regions of the textured substrate comprising the polymer particles face the discrete regions of the uncoated textured substrate and the polymer particles are located on an outside surface of the fibrous structure. The fibrous structures of Example 6 would correspond to a fibrous structure 901" of FIG. 16C in which the first textured substrate 800" is uncoated and the second textured substrate 900" comprises polymer particles 930" on the fourth side 904".

The fibrous structures of Example 7 comprise a textured substrate similar to the textured substrate 100' of 2B, in which polymer particles are deposited on the first side on the low-density discrete regions. The textured substrate comprising polymer particles is joined to a second, uncoated substrate such that the discrete regions of the uncoated substrate face the discrete portions of the textured substrate comprising the polymer particles. The polymer particles are on an outside surface of the fibrous structure. The fibrous structures of Example 7 would correspond to a fibrous structure 901 of FIG. 16A, in which the first textured substrate 800 is uncoated and the second textured substrate 900 comprises polymer particles 920 on the third side 902.

The fibrous structure of Example 8 comprises a textured substrate similar to the textured substrate 100A depicted in FIG. 2E, in which the low-density continuous portion comprises 10% more surface area, as compared to the textured substrates in the other Examples, and in which polymer particles are deposited on the first side on the high density discrete regions. The textured substrate comprising polymer particles is then joined to a second, uncoated textured substrate to form a fibrous structure in which the discrete regions of the uncoated textured substrate face the discrete portions of the textured substrate comprising the polymer particles. The polymer particles are located on an outside surface of the fibrous structure. The fibrous structure of Example 8 would correspond to a fibrous structure 901 of FIG. 16A, in which the second textured substrate 900 is uncoated and the first textured substrate 800 comprises polymer particles 820 on the first side 802.

The fibrous structures of Example 9 comprise a textured substrate in which a width (see FIG. 2E) of the high-density discrete regions has been decreased but a number of the discrete regions has been increased such that the contact surface area comprising the discrete regions remains substantially the same as compared to the textured substrates in the other Examples, and in which polymer particles are deposited on the first side on the high density discrete regions. The textured substrate comprising polymer particles is then joined to a second, uncoated textured substrate to form a fibrous structure in which the discrete regions of the uncoated textured substrate face the discrete portions of the textured substrate comprising the polymer particles. The polymer particles are located on an outside surface of the fibrous structure. The fibrous structures of Example 9 would correspond to a fibrous structure 901 of FIG. 16A, in which the first textured substrate 800 is uncoated and the second textured substrate 900 comprises polymer particles 920 on the first side 902.

The fibrous structures of Example 10 comprise a textured substrate in which a width (see FIG. 2E) of the high-density discrete regions has been decreased but a number of the discrete regions has been increased such that the contact surface area comprising the discrete regions remains substantially the same as compared to the textured substrates in the other Examples, and in which polymer particles are deposited on the first side on the high density discrete regions. The textured substrate comprising polymer particles is then joined to a second, uncoated textured substrate to form a fibrous structure in which the discrete regions of the uncoated textured substrate face the discrete regions of the textured substrate comprising the polymer particles. The polymer particles are located within the fibrous structure. The fibrous structures of Example 10 would correspond to a fibrous structure 901" of FIG. 16C, in which the first textured substrate 800" is uncoated and the second textured substrate 900" comprises polymer particles 920" on the third side 902".

The fibrous structure of Example 11 comprises a textured substrate in which a width (see FIG. 2E) of the high-density discrete regions has been decreased but a number of the discrete regions has been increased such that the contact surface area comprising the discrete regions remains substantially the same as compared to the textured substrates in the other Examples, and in which polymer particles are deposited on the second side on the low-density continuous portions. The textured substrate comprising polymer particles is then joined to a second, uncoated textured substrate to form a fibrous structure in which the discrete regions of the uncoated textured substrate face the discrete regions of the textured substrate comprising the polymer particles. The polymer particles are located on an outside surface of the fibrous structure. The fibrous structures of Example 11 would correspond to a fibrous structure 901" of FIG. 16C, in which the first textured substrate 800" is uncoated and the second textured substrate 900" comprises polymer particles 930" on the fourth side 904".

TABLE 2

| | Polymer Load (gsm) | Cleaning vs PPM Mach 7 Equivalent (*** M7 off-shelf) | vs. uncoated same | BW #/3000 sqft | CRT Rate g/s | CRT Capacity g/sqin |
|---|---|---|---|---|---|---|
| Example 1-1 | 0 | 131% | 100% | 31.2 | 0.49 | 0.62 |
| Example 1-2 | 0.5 | 207% | 158% | | | |
| Example 1-3 | 1 | 263% | 201% | 32 | 0.52 | 0.63 |
| Example 2-1 | 0 | 132% | 100% | | | |
| Example 2-2 | 0.5 | 143% | 109% | | | |
| Example 2-3 | 1 | 182% | 138% | 31.5 | 0.53 | 0.65 |
| Example 3-1 | 0 | 100% | 100% | | | |
| Example 3-2 | 1 | 138% | 138% | 31.3 | 0.54 | 0.63 |
| Example 4-1 | 0 | 100% | 100% | | | |
| Example 4-2 | 1 | 237% | 236% | | | |
| Example 5-1 | 0 | 111% | 100% | 33.2 | 0.56 | 0.68 |
| Example 5-2 | 1 | 147% | 132% | 33.1 | 0.49 | 0.68 |
| Example 6 | 1 | 213% | 222% | 32.8 | 0.53 | 0.68 |
| Example 7-1 | 0 | 137% | 100% | 32 | 0.41 | 0.68 |
| Example 7-2 | 1 | 213% | 155% | 32.7 | 0.57 | 0.71 |
| Example 8-1 | 1 | 258% | 188% | 31.7 | 0.56 | 0.59 |
| Example 9-1 | 0 | 139% | 100% | 31.4 | 0.43 | 0.62 |
| Example 9-2 | 1 | 244% | 176% | 32 | 0.45 | 0.62 |
| Example 10-1 | 0 | 107% | 100% | 31.3 | 0.48 | 0.66 |
| Example 10-2 | 1 | 108% | 101% | 32.2 | 0.38 | 0.65 |
| Example 11 | 1 | 103% | 126% | 32.4 | 0.46 | 0.64 |

TABLE 3

| | Performance Data (Cont'd) | | | | |
|---|---|---|---|---|---|
| | CRT Capacity g/sheet | Dry caliper, mils | Wet caliper, mils | COF Slip Stick-out | COF Kinetic-out |
| Example 1-1 | 75.2 | 39.3 | 32.1 | 809 | 1.12 |
| Example 1-2 | | | | | |
| Example 1-3 | 76.2 | 39.4 | 31.3 | 1021 | 1.17 |
| Example 2-1 | | | | 893 | 1.12 |
| Example 2-2 | | | | | |
| Example 2-3 | 77.7 | 39.3 | 31.3 | 792 | 1.01 |
| Example 3-1 | | | | | |
| Example 3-2 | 75.8 | 39.8 | 31 | 866 | 1.11 |
| Example 4-1 | | | | 846 | 1.06 |
| Example 4-2 | | | | 885 | 1.07 |
| Example 5-1 | 81.7 | 38.1 | 29.8 | 927 | 1.04 |
| Example 5-2 | 82 | 39 | 30.3 | 838 | |
| Example 6 | 82 | 38 | 29.6 | 997 | |
| Example 7-1 | 81.7 | 37.6 | 29.6 | | 1.05 |
| Example 7-2 | 85.6 | 37.8 | 29.7 | | 1.12 |
| Example 8-1 | 71.7 | 36.1 | 31.3 | 703 | 1.15 |
| Example 9-1 | 75.9 | 40.1 | 30.1 | 874 | 1.13 |
| Example 9-2 | 74.2 | 39.7 | 30 | 891 | 1.17 |
| Example 10-1 | 79.2 | 41.2 | 31.6 | | |
| Example 10-2 | 78.5 | 41.7 | 31.5 | 933 | 1.17 |
| Example 11 | 76.6 | 42.5 | 32.4 | 865 | 1.16 |

TABLE 4

| | Performance Data (Cont'd) | | |
|---|---|---|---|
| | COF Slip Stick-in | COF Kinetic-in | SST (g/sec$^{0.5}$) |
| Example 1-1 | 1608 | 1.14 | 1.7 |
| Example 1-2 | | | |
| Example 1-3 | 879 | 0.76 | 1.63 |
| Example 2-1 | 807 | 1.16 | 1.69 |
| Example 2-2 | | | |

TABLE 4-continued

Performance Data (Cont'd)

| | COF Slip Stick-in | COF Kinetic-in | SST (g/sec$^{0.5}$) |
|---|---|---|---|
| Example 2-3 | 1031 | 1.31 | 1.74 |
| Example 3-1 | | | 1.75 |
| Example 3-2 | 821 | 1.10 | 1.64 |
| Example 4-1 | 925 | 1.05 | 1.77 |
| Example 4-2 | 877 | 1.04 | 2 |
| Example 5-1 | 883 | 0.92 | 1.71 |
| Example 5-2 | | | |
| Example 6 | | | 1.65 |
| Example 7-1 | 1189 | 0.82 | 1.56 |
| Example 7-2 | 811 | 1.19 | 1.89 |
| Example 8-1 | 876 | 1.03 | 1.79 |
| Example 9-1 | 1081 | 0.94 | 1.77 |
| Example 9-2 | 1151 | 0.84 | 1.88 |
| Example 10-1 | | | |
| Example 10-2 | 873 | 1.21 | 1.69 |
| Example 11 | 973 | 1.20 | 1.53 |

In all Examples, the addition of polymer particles resulted in at least some improvement in cleaning ability as compared to the equivalent uncoated fibrous structure and to an off-the-shelf product. In particular, Examples 1-2, 1-3, 2-2, 2-3, 3-2, and 4-2 exhibited significant improvements in cleaning ability, and in some instances, the fibrous structures with polymer particles demonstrated a two-fold increase in cleaning ability. In addition, the coefficient of friction (COF) metrics may be correlated to softness, i.e., a pleasing tactile feel of the fibrous structure. As shown in Tables 3 and 4, "COF slip stick-out" (top side of sheet) and "COF slip stick-in" (back side of sheet) are substantially equivalent, despite the presence of polymer particles deposited on one of these faces, which indicates that cleaning is improved and softness is maintained, even in the presence of the polymer particles. The COF slip stick-in of all Examples comprising polymer particles is lower than the COF slip stick-in of Example 1-1, which is an uncoated fibrous structure with the discrete regions facing out. Furthermore, the CRT rate, CRT capacity, and SST (all of which relate to absorbency) are substantially unchanged for many Examples, with respect to uncoated, which indicates that the presence of polymer particles has little or no negative impact on absorbency. Dry caliper and wet caliper are similarly unaffected by the presence of polymer particles.

Process for Measuring Polymer Particle Hardness:

The Vickers hardness is measured at 23° C. according to standard methods ISO 14577-1, ISO 14577-2, and ISO 14577-3. The Vickers hardness is measured from a solid block of the raw material at least 2 mm in thickness. The Vickers hardness micro indentation measurement is carried out by using the Micro-Hardness Tester (MHT; manufactured by CSM Instruments SA, Peseux, Switzerland). As per the ISO 14577 instructions, the test surface should be flat and smooth, having a roughness (Ra) value less than 5% of the maximum indenter penetration depth. For a 200 μm maximum depth, this equates to a Ra value less than 10 μm. As per ISO 14577, such a surface may be prepared by any suitable means, which may include cutting the block of test material with a new sharp microtome or scalpel blade, grinding, polishing, or by casting melted material onto a flat, smooth casting form and allowing it to thoroughly solidify prior testing.

Suitable general settings for the Micro-Hardness Tester (MHT) are as follows:

Control mode: Displacement, Continuous

Maximum displacement: 200 μm Approach speed: 20 nm/s

Zero point determination: at contact

Hold period to measure thermal drift at contact: 60 s

Force application time: 30 s

Frequency of data logging: at least every second

Hold time at maximum force: 30 s

Force removal time: 30 s

Shape/Material of intender tip: Vickers Pyramid Shape/Diamond Tip

Process for Measuring Cleaning Performance

The tiles (typically glossy, white, ceramic 24 cm×4 cm, such as those available from Emaillerie, Belgium) are covered with 0.3 g of typical greasy soap scum soils mainly based on calcium stearate and artificial body soils (such as those commercially available from Equest, Consett, UK) and a small quantity of graphite powder or blue pigment to increase opacity (applied to the tile via spraying with solvent using a consumer-grade airbrush). The soiled tiles are then dried in an oven at a temperature of 140° C. for 10-45 minutes, preferably 40 minutes and then aged between 2 and 12 hours at room temperature (around 20° C.) in a controlled environment humidity (60-85% RH, preferably 75% RH).

A Wet Abrasion Scrub Tester Instrument (such as made by Sheen Instruments Ltd. Kingston, England) is used to clean the tiles. Strips (180×40 mm) of the substrates being tested are affixed to the four sponge holders, using semi-rigid rubber backing pieces with bevelled edges (in turn mounted on sponges of approximately 20 mm thickness). The strips are held in place using small magnets on the side of the sponge holder. An amount of cleaning fluid (2 ml of commercially available Flash Kitchen, UK) is added to each substrate using a syringe. The sponge holder is configured with 200 g of additional mass per sample, then mounted in the Wet Abrasion Scrub Tester. The tile is cleaned at a scrub rate of 37 cycles per minute over a stroke length of 300 mm.

The number of wipes required to clean a stripe in the soil by each substrate is assessed either visually by the operator, or using an automated camera mounted above the sample on which colour-based image analysis is conducted. The cleaning performance of a substrate, referred to as the cleaning index, is defined as the number of wipes required to clean by the reference substrate divided by the number of wipes required to clean by the test substrate, multiplied by 100. If this cleaning index is greater than 100, then the test substrate cleaning is faster than that of the reference substrate.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross-referenced or related patent or application is hereby incorporated herein by reference in its entirety unless expressly excluded or otherwise limited. The citation of any document is not an admission that it is prior art with respect to any form disclosed or claimed herein or that it alone, or in any combination with any other reference or references, teaches, suggests or discloses any such form. Further, to the extent that any meaning or definition of a term in this document conflicts with any meaning or definition of the same term in a document incorporated by reference, the meaning or definition assigned to that term in this document should govern.

While particular aspects of the present disclosure have been illustrated and described, it would be obvious to those skilled in the art that various other changes and modifications may be made without departing from the spirit and scope of the present disclosure. It is therefore intended to cover in the appended claims all such changes and modifications that are within the scope of this disclosure.

What is claimed is:

1. A method of forming a fibrous structure comprising:
providing a first textured substrate comprising:
 a first side with first discrete regions and a first continuous region extending between the first discrete regions; and
 a second side comprising a plurality of first discrete portions corresponding to the first discrete regions and a first continuous portion corresponding to the first continuous region;
passing the first textured substrate across a nozzle of a slot coat header, wherein a heated polymer is dispensed from the nozzle;
depositing the heated polymer onto one of the first or the second side of the first textured substrate to form a plurality of first polymer particles,
wherein the heated polymer is substantially deposited on an area of the first textured substrate that contacts the nozzle such that at least a section of each of the first polymer particles defines a substantially linear raised edge; and joining the first textured substrate to a second substrate to form the fibrous structure.

2. The method of claim 1, wherein:
each first discrete region comprises an outer section and sidewall sections extending outwardly from the adjacent first continuous region to the outer section; and
when the first side is facing the nozzle, the heated polymer is substantially deposited onto the first discrete regions such that the first polymer particles do not extend to the adjacent first continuous region.

3. The method of claim 2, wherein a plurality of the first discrete regions and the corresponding first discrete portions comprise high-density zones and the first continuous region and the corresponding first continuous portion comprise low-density zones.

4. The method of claim 2, wherein a plurality of the first discrete regions and the corresponding first discrete portions comprise low-density zones and the first continuous region and the corresponding first continuous portion comprise high-density zones.

5. The method of claim 2, wherein depositing the heated polymer comprises depositing the heated polymer only onto the first discrete regions.

6. The method of claim 2, wherein depositing the heated polymer comprises depositing the heated polymer only onto the outer sections of the first discrete regions.

7. The method of claim 2, wherein when the second side is facing the nozzle, the heated polymer is deposited onto the first continuous portions such that the first polymer particles do not extend to adjacent first discrete portions.

8. The method of claim 2, wherein when the first side is facing the nozzle, a plurality of the first polymer particles have generally one of a full ring, a partial ring, or a horseshoe shape.

9. The method of claim 8, wherein:
the first polymer particles having generally the full ring shape are formed along a perimeter of the outer section of the respective first discrete region; and
the first polymer particles having generally the partial ring or the horseshoe shape are formed along a segment of the perimeter of the outer section of the respective first discrete region.

10. The method of claim 2, wherein when the first side is facing the nozzle, plurality of the first polymer particles cover substantially an entirety of the outer section of the respective first discrete region.

11. The method of claim 2, wherein when the first side is facing the nozzle, a plurality of the first polymer particles comprise an overhang extending from the outer section of a respective first discrete region, wherein the overhang is substantially parallel to a first surface plane of the first textured substrate.

12. The method of claim 1, wherein at least one characteristic of the polymer particles is at least partially controlled by at least one of a rheological profile, surface energy, or solidification rate of a polymer comprising the heated polymer.

13. The method of claim 1, wherein at least one characteristic of the polymer particle is at least partially controlled by at least one of a polymer flow rate a temperature of the heated polymer and slot coater components, a contact surface area, a feed speed of the textured substrate, a degree of engagement between the textured substrate and the nozzle, or an amount of cooling applied to the textured substrate following formation of the polymer particles.

14. The method of claim 1, further comprising:
blocking one or more sections of the nozzle of the slot coat header such that the heated polymer is deposited only on one or more sections of the first textured substrate.

15. The method of claim 1, wherein:
the second substrate comprises a second textured substrate comprising:
 a third side with second discrete regions and a second continuous region extending between the second discrete regions; and
 a fourth side comprising a plurality of second discrete portions corresponding to the second discrete regions and a second continuous portion corresponding to the second continuous region; and
wherein the method further comprises:
 passing the second textured substrate across the nozzle of the slot coat header, wherein the heated polymer is dispensed from the nozzle; and
 depositing the heated polymer onto one of the third or the fourth side of the second textured substrate to form a plurality of second polymer particles, wherein the heated polymer is substantially deposited on an area of the second textured substrate that contacts the nozzle, such that at least a section of each of the second polymer particles defines a raised edge.

16. The method of claim 15, further comprising:
embossing at least one of the first textured substrate or the second textured substrate.

17. The method of claim 16, wherein the at least one of the first textured substrate or the second textured substrate is embossed prior to depositing the heated polymer.

18. The method of claim 16, wherein the at least one of the first textured substrate or the second textured substrate is embossed after depositing the heated polymer.

19. The method of claim 15, further comprising:
joining the first textured substrate to the second textured substrate such that the first discrete regions of the first textured substrate are facing the second discrete portions of the second textured substrate.

20. The method of claim 15, further comprising:
joining the first textured substrate to the second textured substrate such that the first continuous portion of the first textured substrate is facing the second continuous portion of the second substrate.

* * * * *